United States Patent
Mouline et al.

(10) Patent No.: US 11,070,952 B2
(45) Date of Patent: *Jul. 20, 2021

(54) METHODS OF ALERTING MOBILE-NETWORK SUBSCRIBERS USING AUTOMATED MESSAGING-CHANNEL SELECTION, AND SOFTWARE THEREFOR

(71) Applicant: Everbridge, Inc., Burlington, MA (US)

(72) Inventors: Imad Mouline, Braintree, MA (US); Morten Seliussen, Bergen (NO)

(73) Assignee: Everbridge, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/173,956

(22) Filed: Feb. 11, 2021

(65) Prior Publication Data

US 2021/0168567 A1     Jun. 3, 2021

Related U.S. Application Data

(63) Continuation of application No. 16/946,832, filed on Jul. 8, 2020, now Pat. No. 10,924,891.

(Continued)

(51) Int. Cl.
*H04W 4/06*      (2009.01)
*H04W 4/021*     (2018.01)
*H04W 4/14*      (2009.01)

(52) U.S. Cl.
CPC ............ *H04W 4/06* (2013.01); *H04W 4/021* (2013.01); *H04W 4/14* (2013.01)

(58) Field of Classification Search
CPC ....... H04W 4/90; H04W 76/50; H04W 4/021; H04W 4/029; H04W 4/06; H04W 4/02;
(Continued)

(56) References Cited

U.S. PATENT DOCUMENTS

| | | | | |
|---|---|---|---|---|
| 2,701 A | * | 7/1842 | Frew ...................... | G01D 13/22 116/282 |
| 6,522,250 B1 | * | 2/2003 | Ernst ...................... | G08B 27/00 340/539.1 |

(Continued)

FOREIGN PATENT DOCUMENTS

| WO | WO-03032661 A1 * | 4/2003 | ............ H04W 40/34 |
|---|---|---|---|
| WO | 2012048383 A1 | 4/2012 | |

(Continued)

OTHER PUBLICATIONS

International Search Report and Written Opinion dated Sep. 30, 2020, in connection with PCT/US2020/070246 filed Jul. 8, 2020.

*Primary Examiner* — Matthew C Sams
(74) *Attorney, Agent, or Firm* — Downs Rachlin Martin PLLC

(57) ABSTRACT

An alert system, for alerting target subscribers, that automatically selects which of one or more messaging channels the alert system will use to send alert messages to the target subscribers. In some embodiments for cellular communication networks, an alert system of the present disclosure automatically selects between one or more broadcast messaging channels and one or more point-to-point messaging channels. In some embodiments, the automatic selection of the messaging channel attempts to maximize the number of target subscribers alerted in a predetermined alert-dissemination time. In some embodiments, an alert system of the present disclosure includes one or more user interfaces that allow a user to establish messaging parameters, including various categories of target subscribers to include as desired recipients of the alert message(s). Various methods for implementing one or more aspects of any of the alert systems of the present disclosure are also disclosed.

26 Claims, 11 Drawing Sheets

Related U.S. Application Data

(60) Provisional application No. 62/937,644, filed on Nov. 19, 2019.

(58) Field of Classification Search
CPC ....... H04W 4/14; G08B 25/006; G08B 27/00; G08B 21/12; G08B 27/006; H04L 12/18; H04L 67/18; H04M 2242/04; H04M 3/5116; H04M 1/72536
See application file for complete search history.

(56) References Cited

U.S. PATENT DOCUMENTS

| | | | | |
|---|---|---|---|---|
| 7,747,239 | B1* | 6/2010 | Sennett | H04W 4/14 455/404.1 |
| 8,010,164 | B1* | 8/2011 | Sennett | H04W 4/06 455/567 |
| 8,103,719 | B2* | 1/2012 | Weiser | G08B 25/006 709/203 |
| 8,478,225 | B2* | 7/2013 | Sennett | H04W 4/90 455/404.2 |
| 8,676,153 | B2* | 3/2014 | Sennett | H04W 76/50 455/404.1 |
| 2003/0034888 | A1* | 2/2003 | Ernst | H04L 67/26 340/540 |
| 2003/0069002 | A1* | 4/2003 | Hunter | G09F 27/00 455/404.2 |
| 2004/0140899 | A1* | 7/2004 | Bouressa | G07C 9/27 340/573.1 |
| 2007/0136132 | A1* | 6/2007 | Weiser | H04W 4/06 705/14.64 |
| 2007/0270164 | A1* | 11/2007 | Maier | H04W 64/00 455/456.2 |
| 2009/0325538 | A1* | 12/2009 | Sennett | G08B 27/006 455/404.2 |
| 2010/0174779 | A1* | 7/2010 | Weiser | H04L 12/18 709/203 |
| 2012/0028600 | A1* | 2/2012 | Vallaire | G08B 27/00 455/404.2 |
| 2012/0214405 | A1* | 8/2012 | Wood | H04L 12/14 455/3.05 |
| 2013/0278418 | A1* | 10/2013 | Vallaire | G08B 27/00 340/539.13 |
| 2014/0045529 | A1* | 2/2014 | Bolon | H04W 4/021 455/456.1 |
| 2014/0287711 | A1* | 9/2014 | Williams | H04W 4/12 455/404.1 |
| 2015/0099481 | A1* | 4/2015 | Maitre | H04W 4/029 455/404.2 |
| 2015/0350843 | A1* | 12/2015 | Jensen | H04W 4/029 455/456.3 |
| 2017/0109027 | A1* | 4/2017 | Shubs, Jr. | G06F 3/04845 |
| 2017/0251347 | A1* | 8/2017 | Mehta | H04W 4/90 |
| 2018/0263012 | A1* | 9/2018 | Ryu | H04W 68/02 |
| 2019/0297526 | A1* | 9/2019 | Das | H04W 4/06 |
| 2019/0320310 | A1* | 10/2019 | Horelik | H04W 68/005 |
| 2019/0380020 | A1* | 12/2019 | Pellegrini | H04M 1/72418 |

FOREIGN PATENT DOCUMENTS

| | | | |
|---|---|---|---|
| WO | WO-2012048383 A1 * | 4/2012 | .............. H04W 4/12 |
| WO | 2017118918 A1 | 7/2017 | |
| WO | 2017221104 A1 | 12/2017 | |

* cited by examiner

METHODS OF ALERTING MOBILE-NETWORK SUBSCRIBERS USING AUTOMATED MESSAGING-CHANNEL SELECTION, AND SOFTWARE THEREFOR

RELATED APPLICATION DATA

This application is a continuation of U.S. Nonprovisional patent application Ser. No. 16/946,832, filed Jul. 8, 2020, and titled "INTELLIGENT MESSAGING-CHANNEL SELECTION AND RELATED FEATURES FOR ALERT SYSTEMS, SYSTEMS INCORPORATING SAME AND METHODS AND SOFTWARE THEREFOR", which application claims the benefit of priority of U.S. Provisional Patent Application Ser. No. 62/937,644, filed Nov. 19, 2019, and titled "AUTOMATIC MESSAGING CHANNEL SELECTION FOR ALERT SYSTEMS AND RELATED FEATURES, AND METHODS AND SOFTWARE THEREFOR". Each of these applications is incorporated by reference herein in its entirety.

FIELD OF THE DISCLOSURE

The present disclosure generally relates to the field of emergency alert systems. In particular, the present disclosure is directed to intelligent messaging-channel selection and related features for alert systems, systems incorporating same and methods and software therefor.

BACKGROUND

Alert systems, such as mobile-device-based public warning systems, are deployed on many telecommunications service provider (TSP) platforms around the world. Some of these alert systems utilize short-messaging service (SMS) (point-to-point) messaging to send alert messages to mobile devices carried by people within a given event region to provide those people with information relating to a particular event. Some alert systems have cellular broadcast functionality on one or more generations (2G, 3G, 4G, 5G, etc.) of the broadband cellular network technology utilized by any particular TSP. As is known, cellular broadcasting permits alert messages to be broadcast to all mobile devices connected to any particular generation at any target cell within a relevant network.

SUMMARY OF THE DISCLOSURE

In one implementation, the present disclosure is directed to a method, performed automatically by an alert system on a wireless communications network, of alerting a set of target subscribers via mobile devices carried by the target subscribers. The method includes identifying the mobile devices of the set of target subscribers as targets for receiving an alert within a message-dissemination time; estimating a message-sending time to send an alert to the mobile devices via at least one point-to-point messaging channel; comparing the message-sending time to the message-dissemination time; based on the comparing, determining whether or not to broadcast the alert on a broadcast messaging channel; and based on determining whether or not to broadcast the alert on a broadcast messaging channel, either begin broadcasting the alert on the broadcasting messaging channel; or begin or continue sending the alert on the at least one point-to-point messaging channel.

In another implementation, the present disclosure is directed to a method, performed automatically by an alert system on a wireless communications network, of alerting a set of target subscribers with an alert via mobile devices carried by the target subscribers. The method includes receiving an identification of a target region corresponding to the alert; receiving an identification of an alert timeframe for issuing the alert for the target region; reviewing a footprint to predict whether a subscriber and corresponding first mobile device that are located outside of the target region will be in the target region within the alert timeframe; and when the subscriber is predicted to be in the target region within the alert timeframe: identifying the first mobile device of the subscriber as a target for receiving the alert; and sending a point-to-point alert message to the first mobile device while the first mobile device is outside of the target region and before the subscriber is predicted to be within the target region.

BRIEF DESCRIPTION OF THE DRAWINGS

For the purpose of illustration, the drawings show aspects of one or more embodiments of the disclosure. However, it should be understood that the present disclosure is not limited to the precise arrangements and instrumentalities shown in the drawings, wherein:

FIG. 10 is a screenshot of the example GUI of FIG. 7 showing the same target alert region and alert time window as illustrated in FIG. 7 but with an "Oxygen dependent" filter turned on.

DETAILED DESCRIPTION

In some aspects, the present disclosure is directed to methods and software for performing intelligent automatic messaging-channel selection in a hybrid alert system, for example, a hybrid public warning system. Intelligent messaging-channel selection of the present disclosure may be used to select between/among two or more alert-messaging channels, such as one or more broadcast channels and one or more point-to-point (P2P) messaging channels. Examples of broadcast channels include cellular broadcast (CB) channels of different generations (e.g., 2G, 3G, 4G, 5G, etc.) of cellular network technology, and examples of P2P messaging channels include short messaging service (SMS) messaging channels, email messaging channels, and messaging channels provided by a wide variety of commercial messaging mobile apps including, but not limited to, WhatsApp, iMessage, Snapchat, Facebook Messenger, Instagram, Viber, Skype, Messages, Telegram, etc., among others. It is noted that while most examples shown and described in this disclosure utilize SMS messaging, one or more other types of P2P messaging can be used in addition to or in lieu of SMS messaging. Those skilled in the art will readily understand how to implement aspects and functionalities described herein using any suitable type of P2P messaging.

Alert systems that include automatic messaging-channel selection and/or other feature(s) and functionality(ies) disclosed herein can be used for alerting groups of people, such as members of the public, military personnel, members of a particular organization, etc., with information, such as information concerning a critical event that may put one or more of the people into harm's way. For some embodiments, examples of critical events include natural events (e.g., tornadoes, hurricanes, monsoons, severe lightning, hail, earthquakes, tsunamis, volcanic eruptions, etc.) and other events, such as terrorist attacks, military attacks, chemical spills/leaks, refinery fires/explosions, discovery of infectious disease, among many others. Fundamentally, there is no limitation on the information that may be disseminated, nor, in the case of a triggering event, no limitation on the type of event.

For the sake of illustration, detailed examples described herein are directed to hybrid public warning systems utilizing cellular networks for warning people via corresponding respective ones of a plurality of mobile telecommunication service providers (MTSPs) to which the people subscribe. For convenience, the people intended to receive any particular message via a hybrid public warning system enhanced with one or more features of the present disclosure, including automatic messaging-channel selection, are referred to as "target subscribers." Those skilled in the art will readily appreciate how the broad concepts disclosed herein can be implemented in other systems that may have configurations different from a multi-MTSP configuration.

Figure 1:
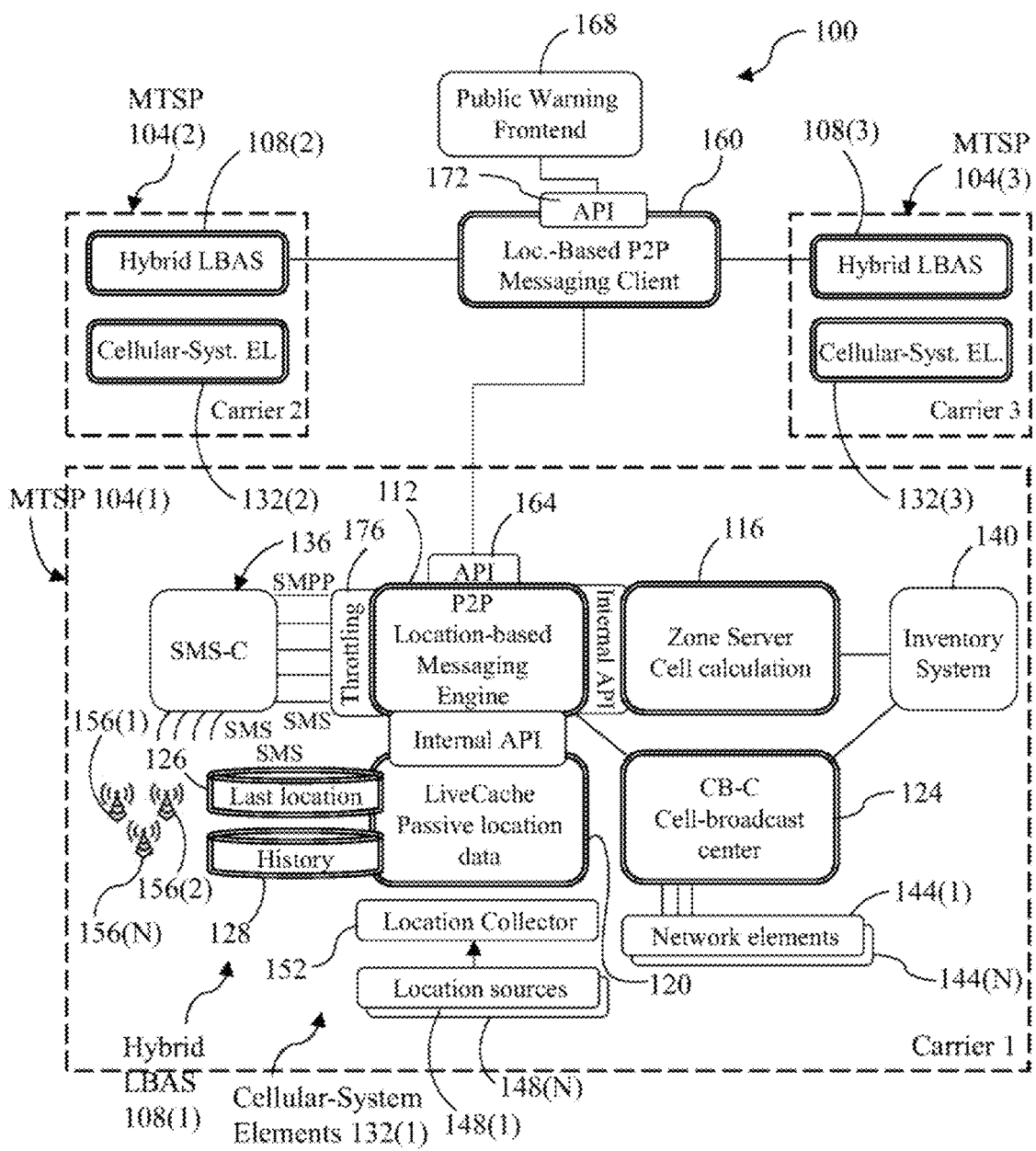
FIG. 1 is a high-level diagram illustrating an example hybrid public warning system having intelligent messaging-channel selection and other features of the present disclosure.

FIG. 1 illustrates an example hybrid alert system, here, a hybrid public warning system 100, implemented via three MTSP systems 104(1) to 104(3) (also labeled and called "Carrier 1", "Carrier 2", and "Carrier 3", respectively). More or fewer than three MTSP systems can be present in any given implementation of a hybrid public warning system of the present disclosure. In this example, the three MTSP systems 104(1) to 104(3) include the same functional MTSP elements as one another, with the example functional MTSP elements being shown only for Carrier 1 104(1) for simplification. In this embodiment, each of the MTSP systems 104(1) to 104(3) includes a hybrid location-based (LB) alert system 108(1) to 108(3) that includes an LB P2P messaging engine 112, a zone-server 116, a live cache 120, a cell-broadcast center (CB-C) 124, a last-location datastore 126, and a history datastore 128, though for simplicity these elements are only shown and labeled for hybrid LB alert system 108(1). Each of the hybrid LB alert systems 108(2) and 108(3) have the same hybrid LB alert system elements as hybrid LB alert system 108(1). As described below, these hybrid-LB alert system elements are utilized in the intelligent automatic messaging-channel selection functionalities and other functionalities described herein.

Each of the MTSP systems 104(1) to 104(3) also include other elements, for example, system elements, collectively represented in corresponding respective ones of the MTSP systems as cellular-system elements 132(1) to 132(3). In this example and as depicted in only MTSP system 104(1) for convenience, each of the MTSP systems 104(1) to 104(3) may include at least one P2P messaging center (here, an SMS center (SMS-C) 136), an inventory system 140, one or more network elements 144(1) to 144(N), one or more location sources 148(1) to 148(N) (e.g., users' mobile devices (not shown)), a location collector 152, and one or more antennas (here, cell sites 156(1) to 156(N)).

It is noted that "N" as used in any element identifier herein and in the accompanying drawings is an integer that represents the last in a series of the corresponding element. The integer "N" can be different for different elements. For example, N may be 20 for the network elements 144(1) to 144(20), while in the same embodiment N may be 500 for the cell sites 156(1) to 156(500). In some embodiments, the hybrid LB alert system elements depicted by double-line shapes in FIG. 1 are elements that are added to each MTSP's cellular network system, while the single-line shapes within MTSP system 104(1) represent elements that may already be part of the MTSP's cellular network system. In this connection, in some embodiments, such as where hybrid LB alert system functionality is added to preexisting cellular-network functionalities, some or all of the cellular-system elements 132(1) to 132(3) of the respective MTSP systems 104(1) to 104(3) may be cellular-system elements that preexist prior to adding the hybrid LB alert system functionalities.

In this example, the hybrid public warning system 100 also includes an LB P2P messaging client 160 that communicates with each of the hybrid LB alert systems 108(1) to 108(3) via a corresponding application programming interface (API) 164 (only one shown for simplicity). Also in this example, the hybrid public warning system 100 further includes a public warning frontend 168 that communicates with the LB P2P gateway 160 via a corresponding API 172. Generally, the functionalities of the various elements depicted in FIG. 1 are as follows.

Location-based P2P Messaging Engine 112: Provides location-based P2P-messaging functionalities (e.g., SMS functionalities) that allow a user to define the target subscribers, as discussed in various examples below.

SMS-C 136: Provides SMS message sending and receiving functionalities. Each generation of cellular network technology, e.g., 2G, 3G, 4G, and 5G, within the corresponding MTSP system has its own SMS functionalities serving the subscribers connected to that generation. This is a specific instantiation of a P2P messaging center.

Zone Server 116: Provides areal and connected-subscriber information for cell sites 156(1) to 156(N) in the cellular network. The zone server 116 is responsible for transforming a user-input polygon (see below) into a list of cell sites 156(1) to 156(N) (cell towers/cell antennas). In one example, not only the cell sites 156(1) to 156(N) located inside the polygon will be included, but also cell sites outside the polygon that affect the polygon (e.g., have at least a part of their signals extending inside the polygon). A reason for the zone sever 116 is to make sure that the live cache 110 (see below) will find the right people, based on which cell site(s) 156(1) to 156(N) their mobile devices, i.e., location sources 148(1) to 148(N), are connected to.

Inventory System 140: Includes technical information, such as geographic locations and coverage areas, about the cell sites 156(1) to 156(N) within the cellular network.

CB-C 124: Provides cellular broadcast messaging functionalities. Each generation of cellular network technology, e.g., 2G, 3G, 4G, and 5G, within the corresponding MTSP system 104(1) to 104(3) has its own CB functionalities serving the subscribers connected to that generation.

Cellular-System Elements 132(1) to 132(3): Represents physical elements and any associated software composing the corresponding cellular network of the respective MTSP system 104(1) to 104(3).

Live Cache 120: Provides location functionalities concerning subscribers to the cellular network of the associated MTSP system 104(1) to 104(3).

Location Sources 148(1) to 148(N): Mobile devices (not shown) belonging to individuals within the cellular network of the associated MTSP system 104(1) to 104(N) that provide their current locations.

Locations Collector 152: Collects current locations of the mobile devices connected to the cellular network of the associated MTSP system 104(1) to 104(N).

Last-Location Datastore 126: Datastore that contains last-known locations of subscribers (mobile devices/location sources 148(1) to 140(N)); updated with data from the locations collector 152.

History Datastore 128: Datastore containing snapshots of locational data regarding mobile devices/location sources 148(1) to 148(N) at various points prior to the current time.

Location-based P2P Messaging Client 160: Gateway located outside of the MTSP systems 104(1) to 104(3) that communicates with the location-based P2P messaging engines 112 of each of the hybrid LB alert systems 108(1) to 108(3).

Public Warning Frontend 168: Provides graphical user interfaces (GUIs) (not shown) that allow users to utilize functionalities of the hybrid public warning system as realized by the functionalities provided by and through the hybrid LB alert systems 108(1) to 108(3) via the location-based P2P messaging client 160.

Details regarding the functionalities of these elements will be apparent to those skilled in the art after reading and understanding this entire disclosure.

Automatic messaging-channel selection functionality in the context of the example hybrid public warning system 100 of FIG. 1 involves the system automatically selecting between at least SMS messaging (and/or other P2P messaging mode) and CB messaging based on any one or more of a number of parameters, including time constraints, nature of the messaging, type(s) of target subscriber, locations of target subscribers, realized SMS (P2P) messaging speed, and actual reach of CB messaging, among others. Typically, a goal of automatic intelligent messaging-channel functionality is to reach as many target subscribers as possible in a given amount of time so as to alert as many people as possible.

As an example, the nature of the messaging may be such that there is little time available to notify target subscribers within a target region. For example, a particular region may be the target of an incoming missile strike that is estimated to hit in 7 minutes. In this scenario, it may be desired to issue emergency warning messages within an available-message-dissemination time, $T_{MD}$, of 2 minutes to give target subscribers sufficient time to seek shelter. In this example, it may be that the hybrid alert system, such as the hybrid public warning system 100 of FIG. 1, determines that it will take 3.4 minutes (i.e., the message sending time Ts to notify target subscribers by SMS messaging). Since 3.4 minutes is greater than the available $T_{MD}$ of 2 minutes, the hybrid public warning system may automatically select the CB channel for sending a broadcast alert message. Here, if $T_{MD}$ were not as limited, SMS messaging may have been the better choice if it were determined that SMS messaging had a greater reach than CB messaging. However, with the time constraint, the lesser reach of CB messaging is the better choice because the number of target subscribers reached is greater than the number of target subscribers that SMS messaging could have reached in the 2-minute $T_{MD}$ timeframe. Many other scenarios and use cases are possible with a hybrid alert system of the present disclosure, such as the hybrid public warning system 100 of FIG. 1. A few examples are described below in the context of FIGS. 3-6.

As illustrated in the screenshots of FIGS. 7-10, in some embodiments of a hybrid alert system of the present disclosure, such as the hybrid public warning system 100 of FIG. 1, one of the initial steps a user may take is to define a target region, which is a physical region on a map that essentially defines the target subscribers targeted to receive an alert message. The shape and size of the target region will vary depending on the type of event at issue. For example, if the event is a bomb threat in which authorities have identified the location of a suspected bomb in a city setting, the target region may cover only a few blocks in every direction. However, if the event is a tsunami, the target region may be a region along 10s or 100s of miles coastline.

Based on an identified target region, the hybrid public warning system can then determine a number of pieces of information, such as which cellular antenna(s) is/are located within the target region, the exact geofenced area covered by those cellular antennas, the number of target subscribers currently connected to those cellular antennas, and the nationalities of the target subscribers in the geofenced area. With the number of target subscribers and other information, such as the technology generation by which each target subscriber is connected, the hybrid public warning system can execute one or more algorithms to determine the best messaging channel(s) (e.g., CB, SMS, and/or other P2P messaging channel(s)) by which to disseminate the appropriate message(s) to as many of the target subscribers as possible or practicable under the constraint(s) (e.g., time) at hand.

Figure 2:
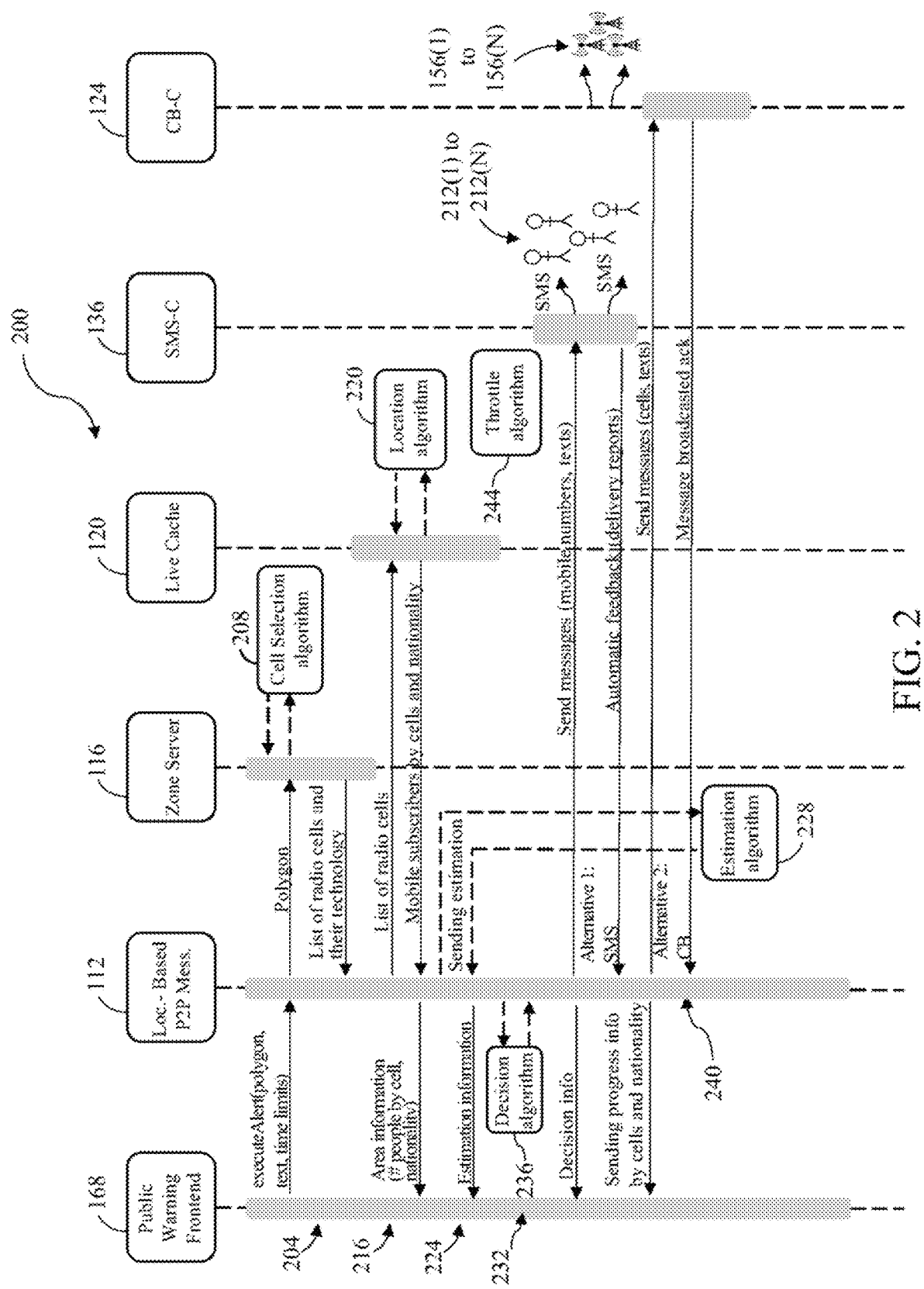
FIG. 2 is a diagram illustrating an example workflow of a warning system of the present disclosure, such as the example warning system of FIG. 1.

With these generalities in mind, FIG. 2 illustrates an example workflow 200 (instruction flow, data flow, algorithm execution) that can be implemented on a hybrid alert system made in accordance with the present disclosure, here, the hybrid public warning system 100 illustrated in FIG. 1 as an example. As can be readily seen in FIG. 2, various elements of the workflow 200 are labeled with the corresponding element labels from FIG. 1. Consequently, the reader can refer to FIG. 1 as needed to fully understand the workflow 200 of FIG. 2 in terms of the example hybrid public warning system 100 of FIG. 1.

Figure 7:
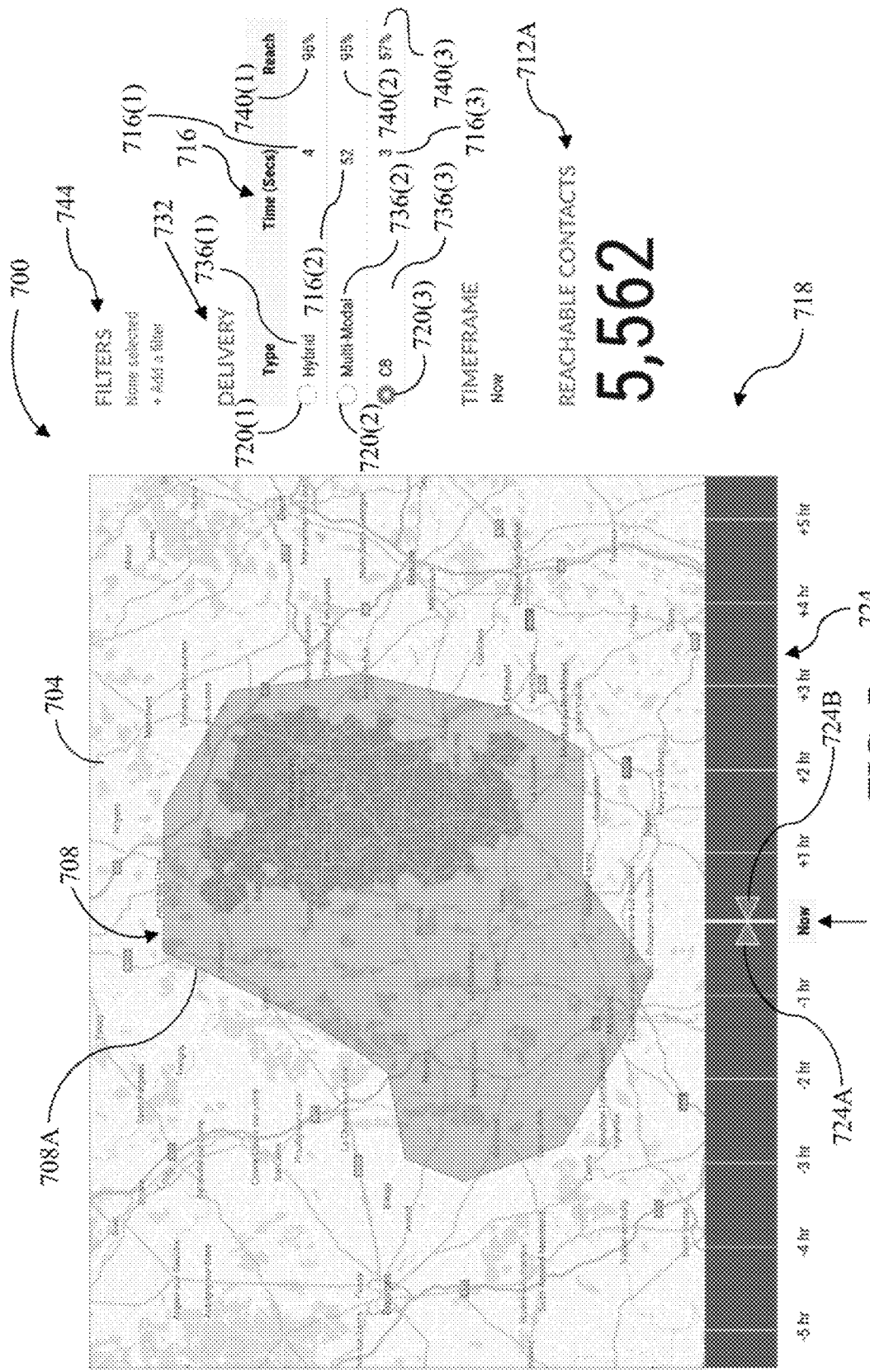
FIG. 7 is a screenshot of an example graphical user interface (GUI) of an example warning system, such as example warning system of FIG. 1, showing an example target alert region, an example alert time window at the current time ("Now"), and other information relating to the automatic messaging-channel selection.

Referring to FIG. 2, in the uppermost cluster 204 of arrows in FIG. 2 connecting to and from a cell selection algorithm 208, the public warning frontend 168 receives from a user (not shown), a definition of a target region, for example, via the user drawing a polygon or other shape (geofence) on an interactive map displayed by a GUI of the public warning frontend 168. For the sake of brief illustration, FIG. 7 illustrates an example GUI 700 displaying a map 704 and an example target region 708 defined thereon by a user-drawn geofence polygon 708A. Referring again to FIG. 2 and FIG. 1, in this example the public warning frontend 168 executes, in response to inputs from the user, an alert function, here "executeAlert(polygon, text, time limits)", based on input variables "polygon" (the boundaries of the desired target region), "text" (the content of one or more alert messages to be sent to mobile devices (not shown) of relevant subscribers 212(1) to 212(N), and "time limits" (the time available for message dissemination and, optionally, for determining the set of subscribers that should receive one or more of the alert messages). In one example, the cell selection algorithm 208 may be accomplished using information concerning the cell sites 156(1) to 156(N) and cell coverage overlap analysis. In some embodiments, all cell sites 156(1) to 156(N) will be selected, along with cell sites that are located outside of the target region but with significant coverage inside the polygon defining the target region. As an example, the zone server 116 may include any cell site 156(1) to 156(N) located outside the polygon but having at least one antenna aimed toward the target region. Those skilled in the art will readily understand the manner in which the zone server 116 can select cell sites 156(1) to 156(N) to be included in a list of cell sites corresponding to the selected target region/polygon. Information returned by the zone server 116 to the location-based P2P messaging engine 112 may include identification(s) of the technology generation(s) (e.g., 2G, 3G, 4G, 5G, etc.) deployed on the listed ones of the cell sites 156(1) to 156(N).

At the next cluster 216 of arrows down from cluster 204 that connect to and from a location algorithm 220, the live cache 120 receives from the location-based P2P messaging engine 112 the list of radio cell sites 156(1) to 156(N) that the location algorithm uses to determine a list of target subscribers by radio cell and nationality. The location algorithm 220 may use location data from any one or more of various sources, such as the last known datastore 126 (where subscribers are now), the history datastore 128 (e.g., what subscribers were in the target region x hours ago or in the last y hours), and/or the location collector 152, among others. In some embodiments, additional information, such as which subscribers live within the target region and/or a footprint can be used. In this context, a "footprint" is a set of historical data that shows where subscribers (via their mobile devices), including the target subscribers 212(1) to 212(N), have been within a certain period of time, such as the past 7 days, based on their most visited places. Depending on the nature of the messaging, the location algorithm 220 may also provide other information, such as last-known locations and/or historical locations for subscribers that may be included in the pool of target-subscribers 212(1) to 212(N) by virtue of one or more reasons other than currently being within the target region. Examples of such other reasons include, but are not limited to inclusion by applying one or more filters, including filters based on having been within the target region within some past amount of time and being projected to be within the target region based on historical time and location data. Examples of filters are described below, for example, in connection with FIG. 10.

Still referring to arrow cluster 216, the location-based P2P messaging engine 112 then provides a target-subscriber count and nationality information to the public warning frontend 168, which may then display the target-subscriber count to the user via a GUI (not shown, but see, e.g., FIG. 7, which shows the GUI 700 displaying a target-subscriber count 712). The GUI may also/optionally display nationality information. However, the hybrid public warning system 100 (FIG. 1) may use nationality information without displaying it to the user, such as to determine the language(s) in which it should send the alert messages. Similarly, the GUI need not necessarily display the target subscriber count, but rather the public hybrid alert system 100 may use this count in its automation.

In the next cluster 224 of arrows down from arrow cluster 216 connecting the public warning frontend 168 and the location-based P2P messaging engine 112 to an estimation algorithm 228, the hybrid public warning system 100 (FIG. 1) uses the target subscriber count and other information, such as SMS messaging throughput on each relevant technology generation, to estimate a time it would take to disseminate messages via the SMS-C 136—which is typically preferred due to greater reach—to all target subscribers that need to receive immediate alert messages due to urgency of the situation (e.g., critical event) at hand. In some embodiments, the estimation algorithm 228 calculates the time it will take to send P2P messages (here, SMS messages) to all target subscribers based on any one or more of a number of factors such as the number of target subscribers by cell site 156(1) to 156(N), total throughput available on the SMS-C 136, and the technology generation (e.g., 2G, 3G, 4G, 5G, etc.) used by the different cell sites, among others. SMS throughput is better with more modern technology such as LTE/4G than with older technology such as GSM/2G. The hybrid public warning system 100 (FIG. 1) may also use the estimation algorithm 228 while sending SMS alert messages to determine how much time it will take to send out remaining messages based on congestion measurements. In an example, the estimation algorithm 228 may utilize delivery reports from the system that indicate if SMS alert messages have gone through (instantly). In this manner, SMS alert message throughput can be measured constantly. If the estimation algorithm 228 determines a change in throughput, especially a relatively quick decrease, the estimation algorithm may assume congestion on the network and make a new estimate for the remaining unsent SMS alert messages on the particular cell site 156(1) to 156(N) at issue. As illustrated in FIG. 2, the hybrid public warning system may communicate estimation information to the public warning frontend 168 for display to the user on a GUI (see, e.g., the GUI 700 of FIG. 7 that shows time estimates 716).

In the next cluster 232 of arrows down from arrow cluster 224 in FIG. 2, the hybrid public warning system 100 (FIG. 1) executes a decision algorithm 236 to make a decision on which one or more messaging channels, e.g., CB, SMS, and/or other P2P channel(s), to use for this particular messaging under consideration. In an example, the decision algorithm may use the estimated SMS-message dissemination time and other information, such as the available message-dissemination time $T_{Avail}$, the type(s) of target subscribers, and/or current locations of the target subscribers, among others, to make the decision on which messaging channel(s) to use for this particular messaging under consideration.

The decision algorithm 236 is configured to choose the best messaging channel(s) to use for a particular scenario. As noted above, a primary goal is to reach as many target subscribers as possible. Typically, in an SMS-based cellular network the best messaging channel is the SMS-C 136, which often can reach over 95% of the target subscribers. However, if it will take more time to send the SMS messages (comparing the incident time requirement and the time estimation(s) from the estimating algorithm 228), the cellular broadcast channel, CB-C 124, will typically be preferred, despite the reduced reach of the CB-C relative to the SMS-C 136. The decision algorithm 236 may also be configured to decide to send SMS messages to only a subset of the target subscribers and use CB messaging for the rest of the target subscribers. An example of this is using SMS messaging for inbound roamers (e.g., visitors from other countries) and CB messaging for the rest of the target subscribers.

In some embodiments, the LB P2P messaging engine 112 provides the decision information to the public warning frontend 168 for display on a suitable GUI. For example, the GUI 700 of FIG. 7 shows the result of the execution of the decision algorithm 236 in a set of radio buttons 720(1) to 720(3). In FIG. 7, radio button 720(3) is shown as being selected. This indicates that the decision algorithm 236 has determined that the cellular broadcast (CB) mode of messaging via CB-C 124 is the most desirable. In this case, the decision algorithm 236 may have selected the cellular broadcast mode because of a very short timeframe being available to disseminate the messages. In some embodiments, when the hybrid public warning system 100 (FIG. 1) has selected the SMS messaging channel, SMS-C 136, for message dissemination, the hybrid public warning system may be configured to continually monitor the sending of the SMS messages and continually execute the estimation algorithm 228 and the decision algorithm 236 to determine whether or not the SMS-C 136 can comply with the original estimated message-dissemination time and, if not, engage the CB-C 124 as needed to meet the $T_{Avail}$ requirement.

Depending on the messaging channel(s) that the decision algorithm 236 has selected, the LB P2P messaging engine 112 engages such messaging channel(s) accordingly, as illustrated by the cluster 240 of arrows in FIG. 2 connecting the LB P2P messaging engine to and from each of the SMS and CB messaging channels of the SMS-C 136 and CB-C 124, respectively. As the SMS-C 136, CB-C 124, and/or other P2P messaging channel(s) perform their respective messaging according to the automatic selection, each channel may provide sending progress to the LB P2P messaging engine 112, which may then provide sending progress information to the public warning frontend 168 for display to a user via a suitable GUI. In some embodiments, the hybrid public warning system 100 (FIG. 1) may use a throttling 176 (FIG. 1) to control the sending of SMS messages to optimize throughput. The throttling 176 (FIG. 1) may be performed by a suitable throttling algorithm 244 that optimizes the sending of SMS messages to the target subscribers, such as target subscribers 212(1) to 212(N).

Generally, throttling 176 (FIG. 1) controls the throughput of SMS messaging down to the level of the cell sites 156(1) to 156(N) to reduce congestion. If congestion is measured, then the throughput will be reduced for that specific cell site 156(1) to 156(N). The throttling algorithm 244 may use call-cell spreading to ensure that all of the capacity in the network is being used at any given time. Mass notification via SMS messaging in a mobile network can be dangerous to use without using the throttling algorithm 244 and can generate much congestion if it is not used. In a worst case, without the throttling algorithm 244, SMS messaging can break down completely within the target region, rendering the SMS messaging channel useless.

As mentioned above, FIGS. 3-6 illustrate various examples and use cases via corresponding respective flow diagrams. Using the foregoing descriptions and FIGS. 1 and 2 for context, each of these figures will be self-explanatory to those skilled in the art. However, the following brief description of each is provided immediately below. As will be seen from reviewing FIG. 3-6, some of the blocks of the flow diagrams contain various software function calls, such as "getSubscriberByCell", "getSubscriberByNationality", and "showSubscribersOnMap", among others. Those skilled in the art will readily understand that these function calls are merely exemplary and can be replaced by any suitable function calls.

Figure 3:
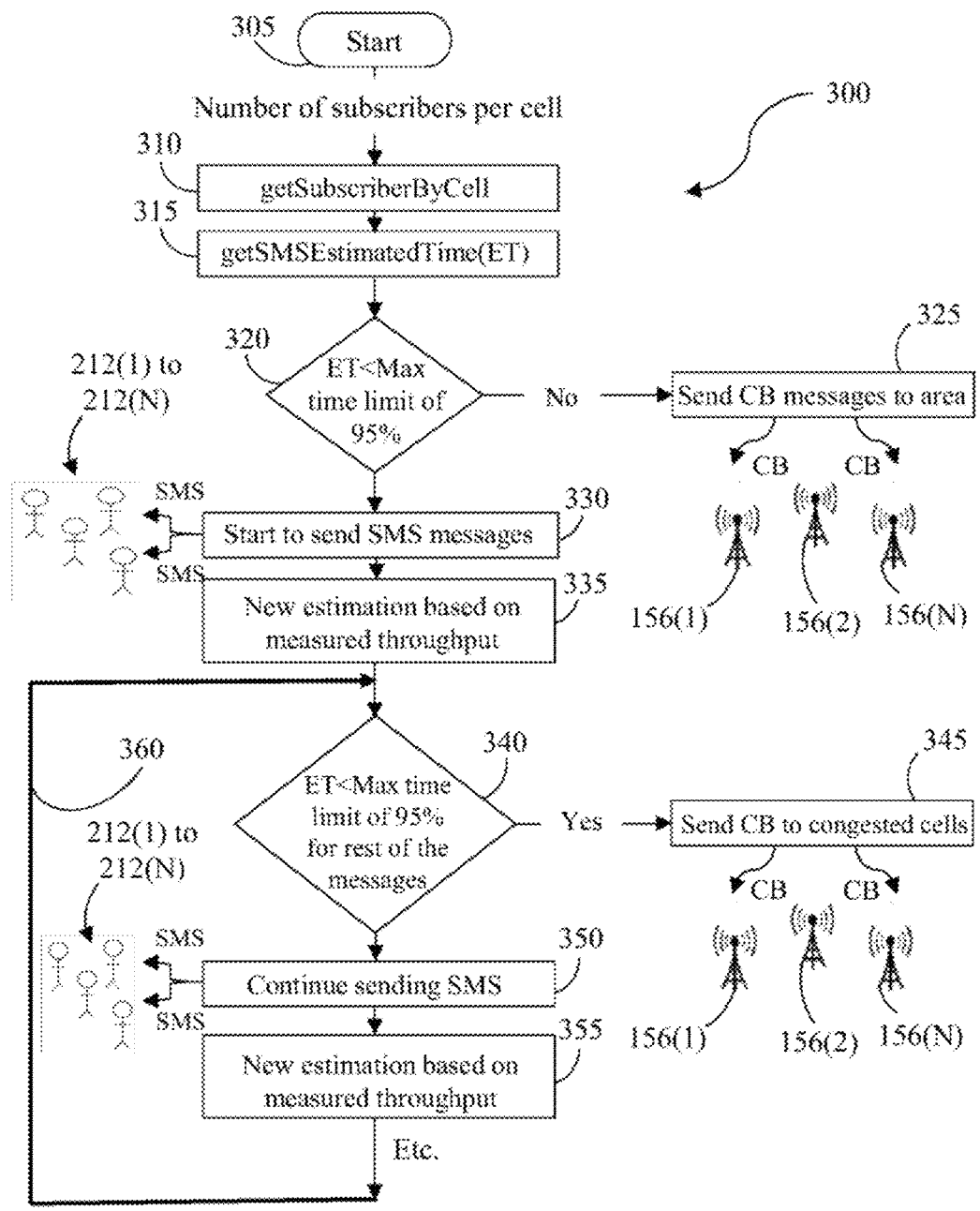
FIG. 3 is a flow diagram illustrating an example method of automatically and intelligently selecting one or more messaging channels for communicating an alert message to subscribers currently within an alert envelope.

FIG. 3 illustrates an example method 300 of intelligent automatic messaging-channel selection that may be performed by a hybrid alert system of the present disclosure, such as the hybrid public warning system 100 of FIG. 1. In this example, the method 300 is directed to a scenario in which all of the target subscribers 212(1) to 212(N) are currently within a defined target region and a user has identified that there is a maximum time limit for getting alert messages to the target subscribers. At block 305, method 300 starts by the hybrid public warning system 100 receiving, via a GUI (not shown, but see, e.g., GUI 700 of FIGS. 7-10) a target region polygon, message text, and a maximum time to 95% sent. Regarding the 95%, in this example, the 95% is chosen based on experience. Typically, 100% is not practically achievable, for example, because some mobile devices may be out of service or out of battery. These mobile devices will get the messages when turned back on or are back within the service area. For example, it may take 3 minutes to achieve 95%, while it may take an hour or more to reach 100%. Consequently, 95%, or other value less than 100%, may be used for practicality's sake. At block 310, the hybrid public warning system 100 executes a "getSubscriberByCell" function call that causes the location algorithm 220 (FIG. 2) to retrieve a list of the target subscribers within the target region. At block 315, the hybrid public warning system 100 executes a "getSMSEstimatedTime" function call that causes the estimation algorithm 228 to determine an estimated time (ET) that the SMS-C 136 would take to send SMS messages to all of the target subscribers retrieved at block 310.

At block 320, the hybrid public warning system 100 compares the estimated time, ET, to the maximum time limit for sending SMS messages. If at block 320 the hybrid public warning system 100 determines that the estimated time is equal to or greater than the maximum time limit for sending SMS messages, then the method 300 proceeds to block 325 at which the hybrid public warning system 100 causes the CB-C 124 to cellularly broadcast the message text via the cell sites 156(1) to 156(N). However, if at block 320 the hybrid public warning system 100 determines that the estimated time is less than the maximum time limit for sending the message text via SMS messaging, then the method 300 proceeds to block 330 at which the hybrid public warning system causes the SMS-C 136 to start sending the message text as SMS messages to the target subscribers 212(1) to 212(N). At block 335, the hybrid public warning system 100 executes the "getSMSEstimatedTime" function call again, which causes the estimation algorithm 228 to determine a new ET that the SMS-C 136 would take to send the remaining SMS messages to the remaining target subscribers 212(1) to 212(N) based on the then-current status of the SMS-C 136 and any other components of the hybrid public warning system 100 that may affect the time it will take the SMS-C to send the remaining SMS messages.

At block 340, the hybrid public warning system 100 again compares the estimated time, ET, to the time remaining for sending SMS messages. If at block 340 the hybrid public warning system 100 determines that the estimated time is equal to or greater than the time remaining for sending SMS messages, then the method 300 proceeds to block 345 at which the hybrid public warning system 100 causes the CB-C 124 to cellularly broadcast the message text via the cell sites 156(1) to 156(N). However, if at block 340 the hybrid public warning system 100 determines that the estimated time is less than the maximum time limit for sending the message text via SMS messaging, then the method 300 proceeds to block 350 at which the hybrid public warning system causes the SMS-C 136 to continue sending the message text as SMS messages to the target subscribers 212(1) to 212(N). At block 355, the hybrid public warning system 100 executes the "getSMSEstimatedTime" function call again, which causes the estimation algorithm 228 to determine a new ET that the SMS-C 136 would take to send the remaining SMS messages to the remaining target subscribers 212(1) to 212(N) based on the then-current status of the SMS-C 136 and any other components of the hybrid public warning system 100 that may affect the time it will take the SMS-C to send the remaining SMS messages. In this example, the method 300 enters a loop 360 that, as long as the new ET remains less than the amount of time remaining to send the message text via SMS messages, causes the hybrid public warning system 100 to execute blocks 340, 350, and 355. Once the hybrid public warning system 100 determines at block 340 that the new ET is equal to or greater than the amount of time remaining to send the message text via SMS messages, the hybrid public warning system causes the CB-C 124 to send the message text by cellular broadcast.

Figure 4:
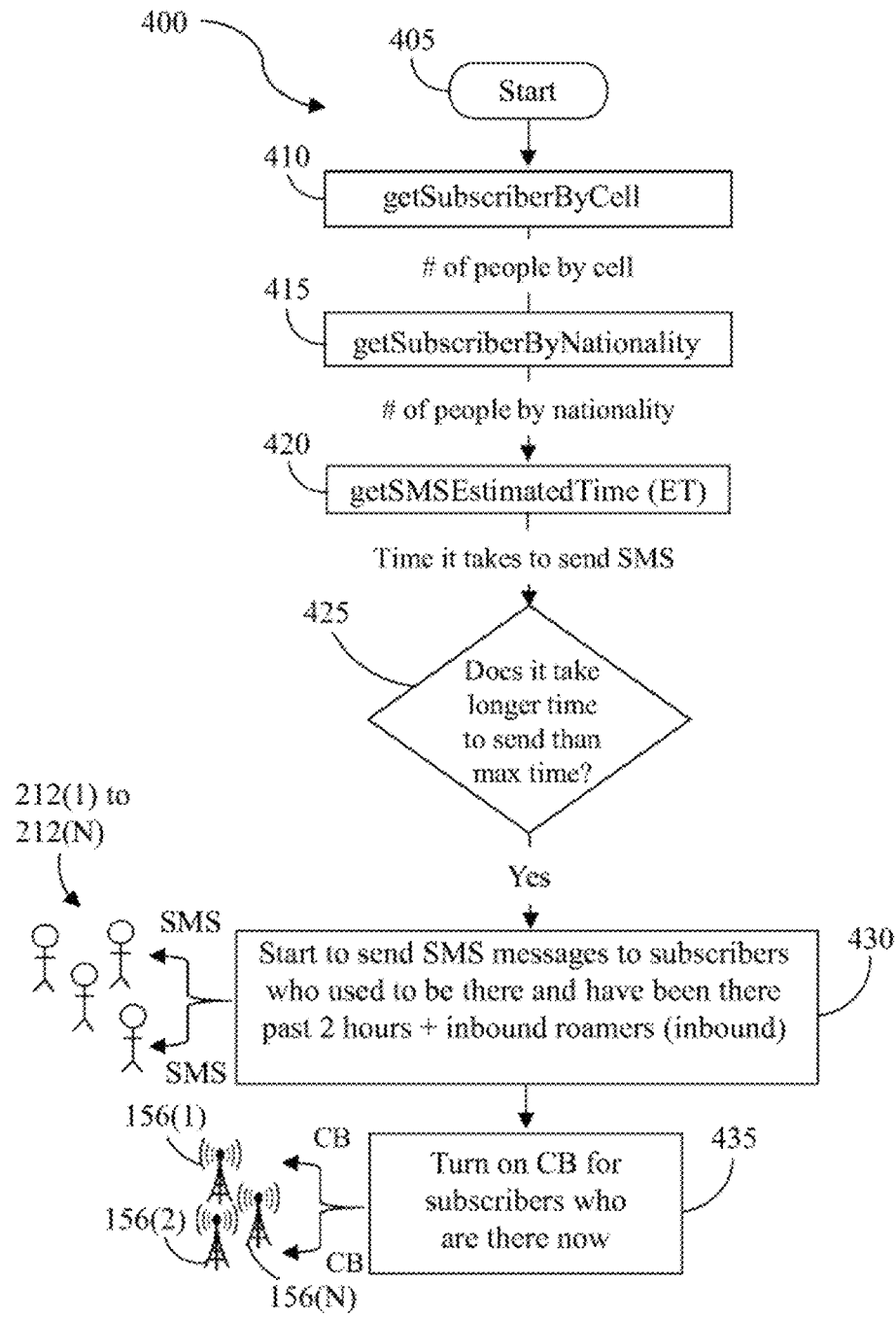
FIG. 4 is a flow diagram illustrating an example method for a use case that utilizes both SMS and cellular broadcast (CB) channels to alert subscribers currently within a target alert region, having a history of being within the target alert region, that were recently in the target alert region, or are inbound to the target alert region.

FIG. 4 illustrates an example method 400 of intelligent automatic messaging-channel selection that may be performed by a hybrid alert system of the present disclosure, such as the hybrid public warning system 100 of FIG. 1. In this example, the method 400 is directed to a scenario in which 1) the target subscribers 212(1) to 212(N) are every subscriber who has been in a target region within the past 2 hours, is currently in the target region, and is anticipated to be in the target region in the next 2 minutes, 2) the maximum time to reach the target subscribers is 2 minutes, and 3) it is desired to reach as many of the target subscribers as possible.

The method 400 starts in this example at block 405 in which the hybrid public warning system 100 receives, via a GUI (not shown, but see, e.g., GUI 700 of FIGS. 7-10) a target region polygon, message text, and the maximum 2-minute time limit. At block 410, the hybrid public warning system 100 executes a "getSubscriberByCell" function call that causes the location algorithm 220 (FIG. 2) to retrieve a list of the target subscribers within the target region. Here, the location algorithm 220 may retrieve a list of target subscribers 212(1) to 212(N) from the last-location datastore 126, the history datastore 128, and the footprint to determine people likely to be target subscribers. At block 415, the hybrid public warning system 100 executes a "getSubscriberByNationality" function call that causes the hybrid public warning system to identify various ones of inbound roamers from other countries as ones of the target subscribers 212(1) to 212(N). At block 420, the hybrid public warning system 100 executes a "getSMSEstimatedTime" function call that causes the estimation algorithm 228 to determine an estimated time (ET) that the SMS-C 136 would take to send SMS messages to all of the target subscribers retrieved at blocks 410 and 415. In one example, the estimation algorithm 228 estimates the ET to be 2 minutes and 20 seconds.

At block 425, the hybrid public warning system 100 determines whether or not the ET is greater than the maximum allowable time. In the example wherein the ET is 2 minutes and 20 seconds, the result is yes, and, consequently, the hybrid public warning system 100 chooses to use cellular broadcasting as the primary messaging channel. However, it also chooses to use the SMS messaging channel for a subset of the target subscribers, here, all of the target subscribers 212(1) to 212(N) that are not currently within the target region, i.e., the ones of the target subscribers that were in the target region within the past 2 hours but have since left, and the ones of the target subscribers that are inbound roamers (e.g., tourists) and may have a native language different from native language(s) of the country(ies) in which the target region is located. Consequently, the example method 400 may proceed to block 430 at which the hybrid public warning system 100 causes the SMS-C 136 to send the message text to the ones of the target subscribers 212(1) to 212(N) not currently within the target region and to the inbound roamers, with the message text to inbound roamers being translated (e.g., automatically by the hybrid public warning system) to the native language(s) of the corresponding respective inbound roamers. At block 435, the hybrid public warning system 100 causes the CB-C 124 to broadcast the message text via the relevant cell sites 156(1) to 156(N) for the target region to the ones of the target subscribers 212(1) to 212(N) currently within the target region.

Because of differences in native languages, even if the inbound roamers receiver the broadcast message text, they may not be able to understand the message text; hence the use of native-language SMS messages in this example. In one example, about 50% to 70% of the target subscribers will see the cellularly broadcast message text, and perhaps additional target subscribers that are not in the target region anymore will get an SMS version of the message text. In addition, in an example, probably 95% of inbound roamers will get an SMS version of the message text, probably within seconds, since in many cases only 2% to 7% of target subscribers are inbound roamers.

Figure 5:
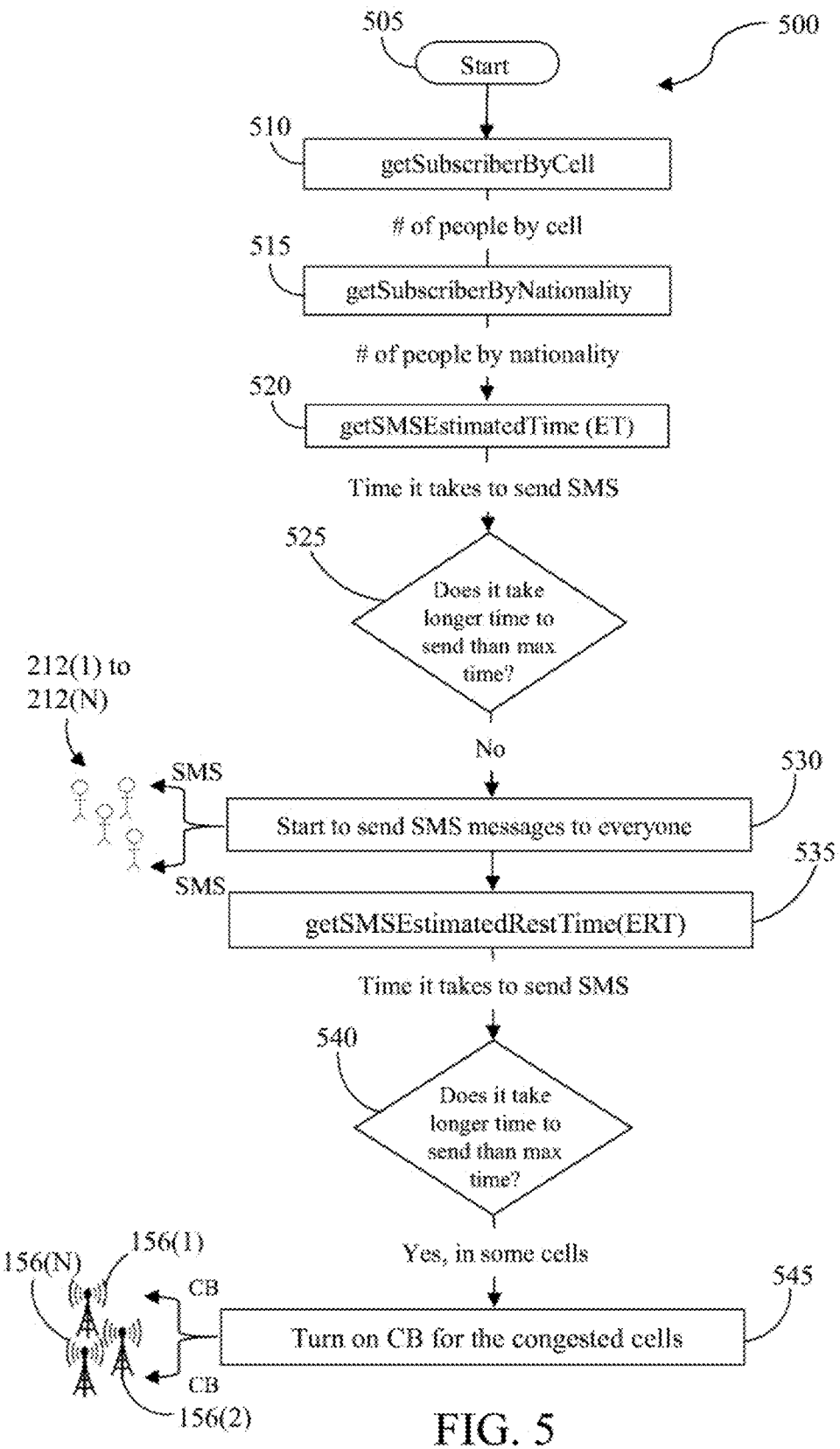
FIG. 5 is a flow diagram illustrating an example method for a use case in which congestion develops during SMS messaging.

FIG. 5 illustrates an example method 500 of intelligent automatic messaging-channel selection that may be performed by a hybrid alert system of the present disclosure, such as the hybrid public warning system 100 of FIG. 1. In this example, the method 500 is directed to a scenario in which 1) the target subscribers 212(1) to 212(N) are every subscriber that is currently within a target region and are predicted to be in the target region in the next 3 minutes, 2) the maximum time to reach the target subscribers is 3 minutes, and 3) it is desired to reach as many of the target subscribers as possible.

In this example, the method 500 starts at block 505 in which the hybrid public warning system 100 receives, via a GUI (not shown, but see, e.g., GUI 700 of FIGS. 7-10) a target region polygon, message text, and the maximum 3-minute time limit. At block 510, the hybrid public warning system 100 executes a "getSubscriberByCell" function call that causes the location algorithm 220 (FIG. 2) to retrieve a list of the target subscribers within the target region. Here, the location algorithm 220 may retrieve a list of target subscribers 212(1) to 212(N) from the last-location datastore 126, the history datastore 128, and the footprint to determine people likely to be target subscribers. At block 515, the hybrid public warning system 100 executes a "getSubscriberByNationality" function call that causes the hybrid public warning system to identify various ones of inbound roamers from other countries as ones of the target subscribers 212(1) to 212(N). At block 520, the hybrid public warning system 100 executes a "getSMSEstimatedTime" function call that causes the estimation algorithm 228 to determine an estimated time (ET) that the SMS-C 136 would take to send SMS messages to all of the target subscribers retrieved at blocks 510 and 515. In one example, the estimation algorithm 228 estimates the ET to be 1 minute and 45 seconds.

At block 525, the hybrid public warning system 100 determines whether or not the ET is greater than the maximum allowable time. In the example wherein the ET is 1 minute and 45 seconds, the result is no, and, consequently, the hybrid public warning system 100 chooses to use the SMS messaging channel for all of the target subscribers 212(1) to 212(N). Consequently, the example method 500 may proceed to block 530 at which the hybrid public warning system 100 causes the SMS-C 136 to start sending the message text to all of the target subscribers 212(1) to 212(N), with the message text to inbound roamers being translated (e.g., automatically by the hybrid public warning system) to the native language(s) of the corresponding respective inbound roamers.

At block 525, the hybrid public warning system 100 executes a "getSMSEstimatedRestTime" function, which causes the estimation algorithm 228 to determine an estimated remaining time (ERT) that the SMS-C 136 would take to send the remaining SMS messages to the remaining target subscribers 212(1) to 212(N) based on the then-current status of the SMS-C 136 and any other components of the hybrid public warning system 100 that may affect the time it will take the SMS-C to send the remaining SMS messages. For example, the "getSMSEstimatedRestTime" function also takes measured congestion into account, for example, based on the difference from the time the location-based P2P messaging engine 112 sends the SMS alert messages to the SMS-C 136 (i.e., mobile terminated (MT)) to the arrival time of the delivery report (DR) at the location-based P2P messaging engine from the SMS-C 136 and calculates a time to send the rest of the SMS messages by cell site 156(1) to 156(N).

At block 540, the hybrid public warning system 100 determines whether or not the ERT is greater than the maximum time remaining for sending the message text via SMS. In this example, the hybrid public warning system 100 determines that some cell sites 156(1) to 156(N) are congested to the point that they cannot send all of the designated SMS messages in the remaining time. As a result, at block 545 the hybrid public warning system 100 causes the CB-C 124 to control the congested ones of the cell sites 156(1) to 156(N) to transmit the message text by cellular broadcasting. As discussed above, congestion may be determined by measuring the average time it takes from sending an SMS message (MT) to receiving the DR. If this average time (e.g., last 30 second average) is increasing significantly (e.g., doubles), this indicates congestion. In this example, the SMS-C 136 continues to cause the non-congested ones of the cell sites 156(1) to 156(N) to continue sending the message text as SMS messages.

Figure 6:
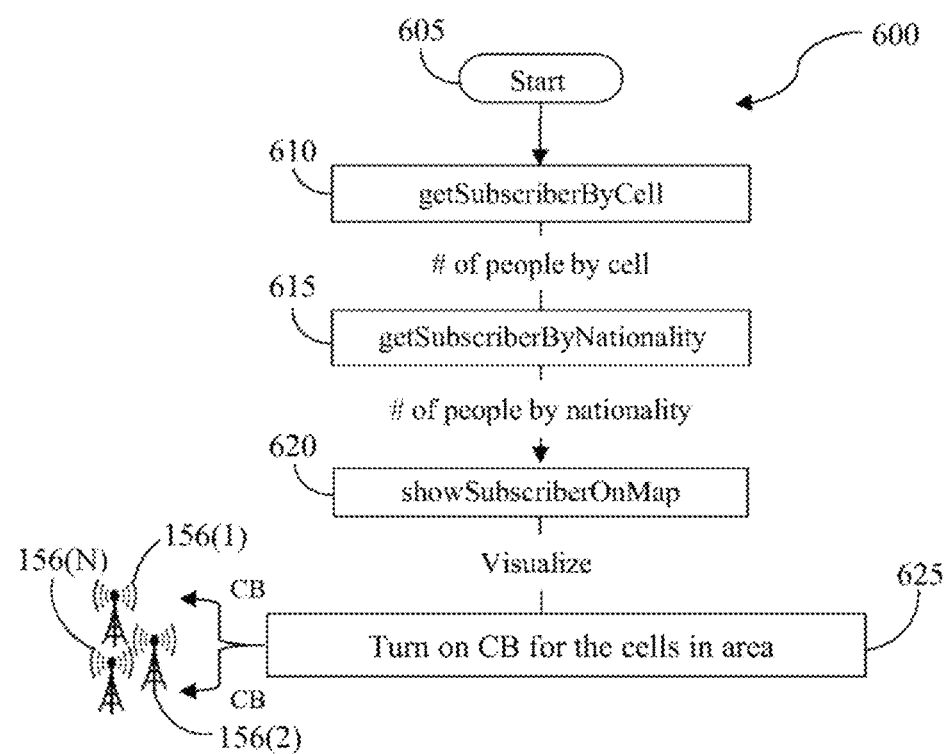
FIG. 6 is a flow diagram illustrating an example method for a use case that visualizes target subscribers, including inbound roamers, within a target alert region and that uses a CB channel to notify target subscribers.

FIG. 6 illustrates an example method 500 of intelligent automatic messaging-channel selection that may be performed by a hybrid alert system of the present disclosure, such as the hybrid public warning system 100 of FIG. 1. In this example, the method 600 is directed to a scenario in which 1) the target subscribers are every subscriber that is currently in a target region, 2) the maximum time to reach the target subscribers 212(1) to 212(N) is 20 seconds, and 3) it is desired to reach as many of the target subscribers as possible.

In this example, the method 600 starts at block 605 in which the hybrid public warning system 100 receives, via a GUI (not shown, but see, e.g., GUI 700 of FIGS. 7-10) a target region polygon, message text, and the maximum 20-second time limit. At block 610, the hybrid public warning system 100 executes a "getSubscriberByCell" function call that causes the location algorithm 220 (FIG. 2) to retrieve a list of the target subscribers within the target region. Here, the location algorithm 220 may retrieve a list of target subscribers 212(1) to 212(N) from the last-location datastore 126, the history datastore 128, and the footprint to determine people likely to be target subscribers. At block 615, the hybrid public warning system 100 executes a "getSubscriberByNationality" function call that causes the hybrid public warning system to identify various ones of inbound roamers from other countries as ones of the target subscribers 212(1) to 212(N). At block 620, the hybrid public warning system 100 executes a "showSubscriberOnMap" function call that causes the hybrid public warning system 100 to visualize on a map via a GUI (such as the GUI of FIGS. 7-10) the locations of the target subscribers. The visualization may also display the nationalities of the inbound roamers from other countries.

In this scenario, at block 625, the hybrid public warning system 100 causes the CB-C 124 to broadcast the message text via all of the cell sites 156(1) to 156(N) in the target region. All of the target subscribers 212(1) to 212(N) (FIG. 2) that are within the range of one of the broadcasting cell sites 156(1) to 156(N) and able to receive cellularly broadcast messages will receive the broadcast message text. The rest of the target subscribers 212(1) to 212(N) will not. In an example, about 50% to 70% of the target subscribers will see the cellularly broadcast message text. With the visualization, it is possible to see how many target subscribers are in the target region when making the cellular broadcast. However, the hybrid public warning system 100 does not use any other communication channel(s). This may be so because the hybrid public warning system 100 does not include SMS support or otherwise does not have access to the SMS-C 136 (FIG. 1). However, the location visualization can be useful for situational awareness.

The foregoing methods 300, 400, 500, and 600 and corresponding use cases are presented simply for the sake of illustrations. Those skilled in the art will readily understand that intelligent automatic messaging-channel selection techniques disclosed herein can be used to create many other methods for many other use cases. Indeed, given the vast number of scenarios in which intelligent automatic messaging-channel selection can be implemented, it is virtually impossible to describe them all exhaustively. However, that is not needed for those skilled in the art to be able to adapt the principles of the present disclosure to methods involving intelligent automatic messaging-channel selection suitable for such scenarios and use cases. That said, some additional use cases are described below following descriptions of FIGS. 7-10.

FIGS. 7-10 are, respectively, screenshots 718, 800, 900, and 1000 of an example GUI 700 driven by, for example, the public warning frontend 168 of FIGS. 1 and 2. In this example, the GUI 700 includes a map region 704A that displays an interactive geographical map 704 that contains a target region 708 for messaging performed in accordance with one or more aspects of the present disclosure. The interactive geographical map 704 is designed and configured to allow a user to draw a polygon 708A or other shape to geofence the desired target region 708 (darker-shaded region) for a particular messaging scenario. As discussed above, the hybrid public warning system 100 (FIG. 1) may be configured to use the defined target region 708 to determine which cell sites 156(1) to 156(N) (FIG. 1) are located within the target region and, from that information, determine the number, or count 712, of target subscribers 212(1) to 212(N) (FIG. 2) currently connected to the identified cell sites as determined via their corresponding respective mobile devices in a manner known in the art. In this example, this count is displayed in a "REACHABLE CONTACTS" region 712A of the GUI 700.

This example GUI 700 also includes a target-identification (ID) timeframe control 724 below the interactive map 704. This target-ID timeframe control 724 includes a pair of graphical sliders 724A and 724B (triangular shaped in this example), that a user (not shown) can independently control to set a timeframe for determining the possible target subscribers that should be included in the messaging operations. In FIG. 7, the two sliders 724A and 724B are immediately adjacent to one another at the current time 728 ("Now"), which indicates that the timeframe for determining the possible target subscribers is the set of subscribers currently in the defined geofenced target region 708. Compare the target-ID timeframes set in FIGS. 9-11 via the sliders 724A and 724B of the target-ID timeframe control 724 for further understanding of the operation of the target-ID timeframe control. In this scenario, since the target-ID timeframe is only now, i.e., does not extend into the past or future, the only target subscribers currently within the target region 708 are included in the count displayed in the "REACHABLE CONTACTS" region 712A of the GUI 700.

The example GUI 700 further includes a "DELIVERY" region 732 that, in this embodiment, displays the possible messaging channel types, here channel types 736(1) to 736(3), along with the corresponding set of radio buttons 720(1) to 720(3), corresponding message-dissemination time estimates 716(1) to 716(3), and corresponding reach values 740(1) to 740(3). In this example, the available channel types 736(1) to 736(3) are "Hybrid" (a combination of CB and SMS), "Multi-Modal" (a combination of SMS, email, voice, and/or other P2P channel(s)), and "CB" (cellular broadcast only). Regarding the reach values 740(1) to 740(3), as those skilled in the art will appreciate, the reach of each message-disseminator type can be affected by one or more of a variety of factors, such as mobile device make and model, technology generation utilized for any particular subset of target subscribers, state of each mobile device, and opt-in/opt-out status, among others. In this example, the decision algorithm 236 (FIG. 2) has automatically selected the "CB" type 736(3) of messaging, and the GUI 700 displays this selection via the radio buttons 720(1) to 720(3). In some embodiments, a user can override the automatic selection. For example and for the GUI 700 illustrated, the user may select one of the two non-selected radio buttons, here, 720(1) or 720(2), to effect the override.

The GUI 700 illustrated in FIG. 7 also includes a "FILTERS" region 744 where a user can set and/or select one or more include-type filters and/or one or more exclude-type filters to more specifically define the target subscribers as needed. In the example of screenshot 718 of FIG. 7, filters are not used.

Not shown in the example GUI 700 is a GUI that allows a user to define other parameters of the current messaging scenario, such as the type of a critical event, the content(s) of the one or more messages to be disseminated, and the available message-dissemination time, $T_{Avail}$. While not shown, such a GUI can provide important functionality to the hybrid public warning system 100 (FIG. 1). In some embodiments, each of forgoing parameters can be set using, for example, dropdown menus and/or popup windows or other common interactive GUI features. For example, a list of critical event selections may be presented to the user. Upon user selection and/or confirmation, the messaging system may then automatically select the corresponding message(s) and/or the available message-dissemination time, $T_{Avail}$. In some embodiments, a user may need to input all three types of information. In some embodiments, automatic selections may be made in conjunction with user selections. In some embodiments, a user may be permitted to override one or more automatic selections. Those skilled in the art will readily appreciate the wide variety of GUIs that can be designed to effect the myriad of functionalities described herein.

Figure 8:
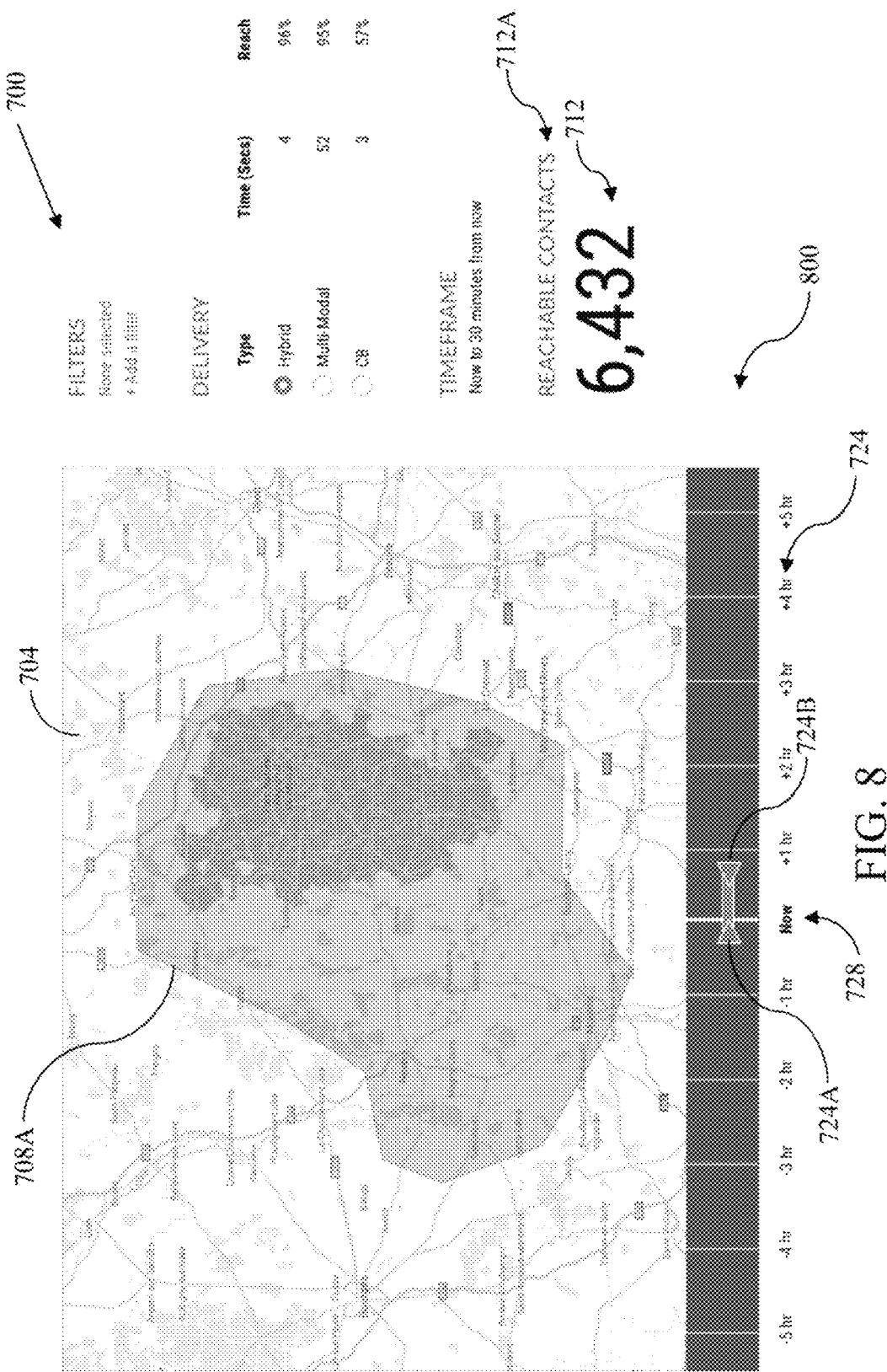
FIG. 8 is a screenshot of the example GUI of FIG. 7 showing the same target alert region as illustrated in FIG. 7 but with a different alert time window.

FIG. 8 shows the same GUI 700 as in FIG. 7 but with the controls 724A and 724B of the target-ID timeframe control 724 set to make the target-ID timeframe from the current time 728, i.e., "Now", to 30 minutes from now into the future. In this example, the hybrid public warning system 100 (FIG. 1) will keep the geofence and corresponding messaging open for 30 minutes. A difference from the scenario depicted in FIG. 7 is that the hybrid public warning system 100 (FIG. 1) can use current and/or historical location and/or trend information to predict whether or not subscribers currently outside of the target region 708 will be arriving into the target region within the 30-minute target-ID timeframe. The hybrid public warning system 100 (FIG. 1) can then include these predicted (i.e., estimated) arriving subscribers in the target subscriber count 712 displayed in the "REACHABLE CONTACTS" region 712A. The hybrid public warning system 100 (FIG. 1) will use information about these estimated additional target subscribers, such as mobile-device make and model, technology generation, nationality, etc., to update relevant information, including the estimated message-dissemination times and estimated reaches that the GUI 700 displays.

Figure 9:
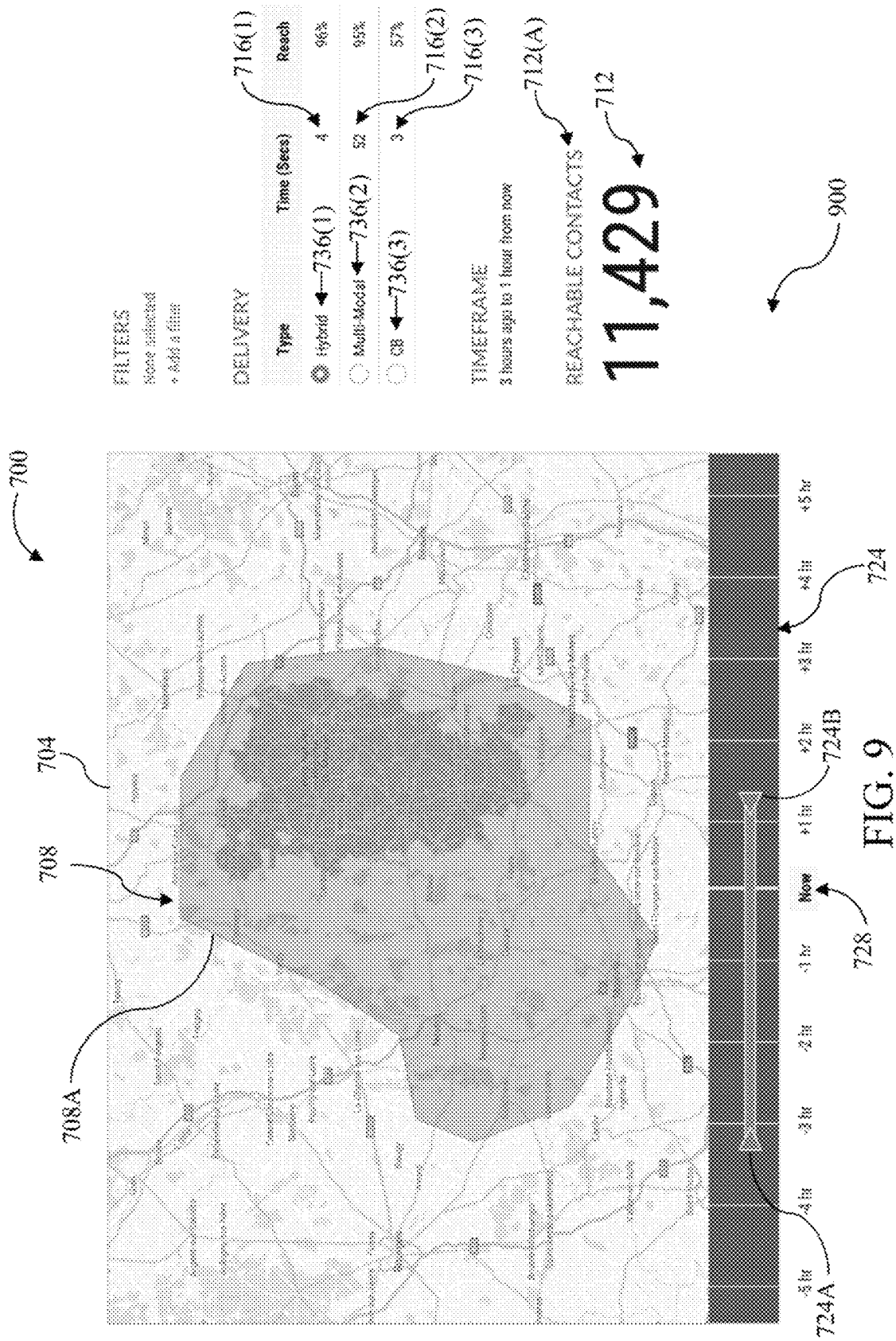
FIG. 9 is a screenshot of the example GUI of FIG. 7 showing the same target alert region as illustrated in FIG. 7 but with a further different alert time window.

FIG. 9 shows the same GUI 700 as in FIGS. 7 and 8 but with the controls 724A and 724B of the target-ID timeframe control 724 set to make the target-ID timeframe be 3 hours into the past to 1 hour into the future. In this scenario, the hybrid public warning system 100 (FIG. 1) may not only predict a count of subscribers that will become target subscribers by entering into the target region 708 within the next 1 hour (see above), but it may also use historical location information (e.g., periodic snapshots of location information) to determine all of the target subscribers that are currently outside of the target region but were in the target region up to 3 hours before the current time 728 ("Now"). Then, the count 712 of target subscribers that the GUI 700 displays in "REACHABLE CONTACTS" region 712A is the sum of the subscribers currently located in the target region 708, the subscribers predicted to enter the target region within the next 1 hour, and the subscribers that were present at one point or another within the past 3 hours from the current time 728, i.e., "Now". The hybrid public warning system 100 (FIG. 1) uses the estimating algorithm 228 and the decision algorithm 236 to perform their respective functions to update estimates of dissemination time estimates 716(1) to 716(3) and reach and decision on which messaging type 736(1) to 736(3) to implement. It is noted that the CB type 736(3) alone will not work in this scenario, because cellular broadcasts within the target region 708 now and in the future will not reach the target subscribers that were inside the target region within the past 3 hours but are now outside of the target region and will not return to the target region within the 1 hour that the geofence and messaging is set to remain open. Therefore, at a minimum, the SMS messaging type and/or other P2P messaging must be used.

Figure 10:
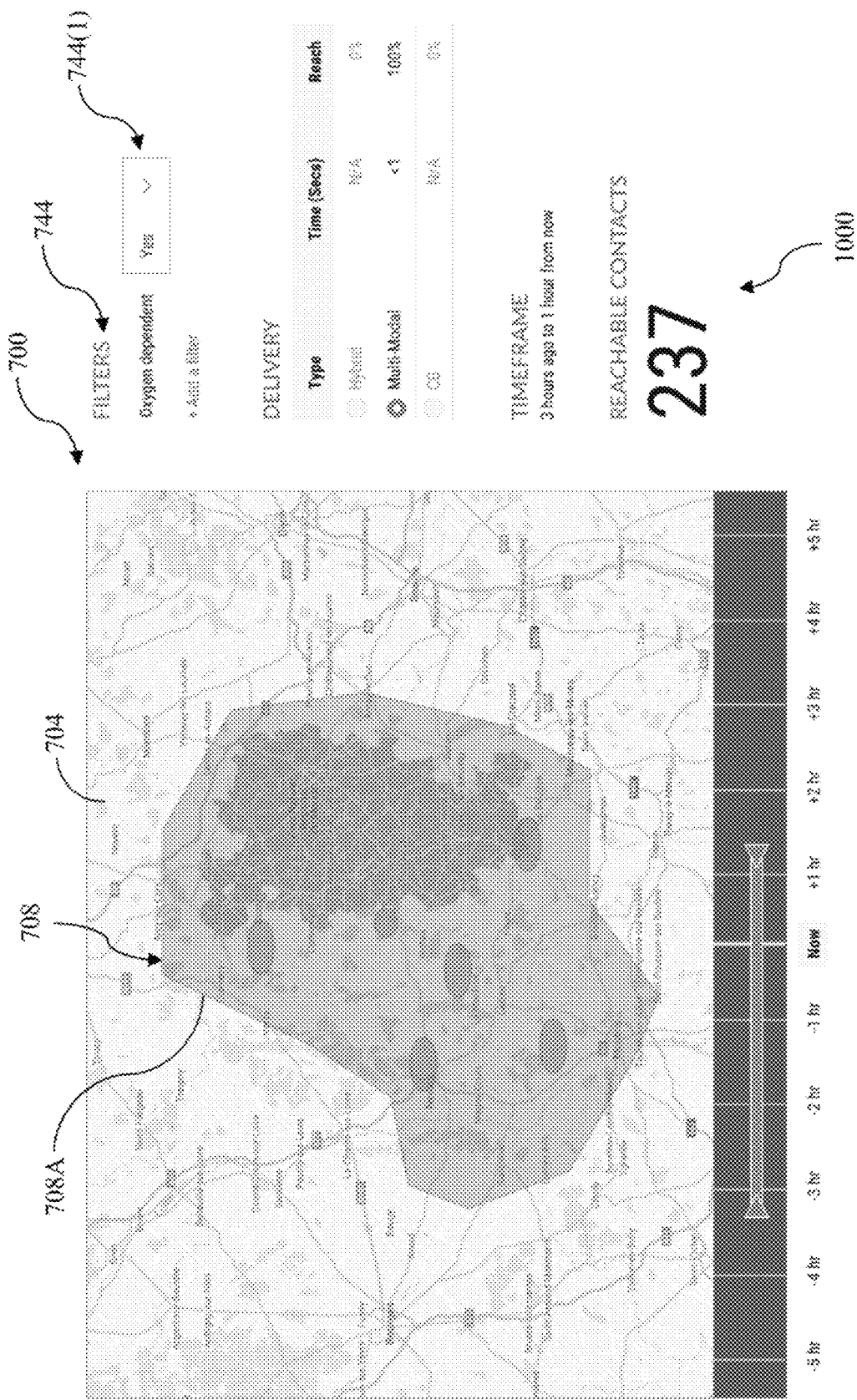

FIG. 10 illustrates the same GUI 700 as illustrated in FIGS. 7-9 using the same target-ID timeframe as appears in FIG. 9, but with a filter 744(1) activated in "FILTERS" region 744. In this example, the filter 744(1) identifies only the subset of the total subscribers identified in FIG. 10 that are oxygen dependent. As can be seen by comparing the "REACHABLE CONTACTS" counts 712 of FIGS. 9 and 10, applying the oxygen dependent filter 744(1) reduces the target subscribers from 11,429 to 237. In this example, as seen in FIG. 10, the GUI 700 displays the general locations of the oxygen-dependent target subscribers within the target region 708 as darker ovals 748(1) to 748(6), here, scattered throughout the target region. As with other examples, no personally identifying information is provided outside the MTSP network(s) at issue, as that would be a privacy violation.

ADDITIONAL EXAMPLES

A—Building a New Alert

In the context of the hybrid public warning system 100 of FIG. 1, the nature of the API 172 may be synchronous. The public warning frontend 168 will typically always get a response on a request within a relatively short period of time. The public warning frontend 168 will never send anything in return as a post back. All information coming from the public warning frontend 168 will be as a response from an alert request.

As a first step, a user can enter a geofencing polygon (see, e.g., polygon 708A of FIG. 7) and receive a number of subscribers in return (a quick count). In some embodiments, the API 172 (FIG. 1) may also support more detailed information about these subscribers like number of people from different countries and to what cell sites 156(1) to 156(N) they are connected. To maintain privacy, information processed by the public warning frontend 168 is generally only statistics. It is not possible to get personal identifying information about individuals. The API 164 is privacy protected when it comes to this.

The pre-alert process may be stateless. The user can initiate counts as many times as they want (including adjustments to the polygon, change in filters, etc.). The alert does not need to be prepared before execution.

A next step can be the alert execution. This may also be a synchronous operation in the sense that the hybrid public warning system 100 may immediately and automatically return a unique alert ID. The actual process of sending all the messages may then be performed asynchronously. In the API 172, all data relevant to the alert may be sent in as a request.

After execution, the alert may go into different states. The hybrid public warning system 100 may prepare the alert. The LB P2P messaging client 160 may then need to collect the mobile numbers inside the target region but not share it outside the LB P2P messaging client 160 (for privacy). A next step may be for the hybrid public warning system 100 to start sending the alert messages. The alert messaging may then continue until all messages have been sent. During this period of time (it might take a while, depending, for example, on the magnitude of the alert and throughput)—the LB P2P messaging client 160 may use the automatically generated alert ID to ask the LBS system about the status of the given alert. This can be done as many times as desired and can be done regardless of what state the alert is in.

Pre-Alert Count:

In some embodiments, it is possible for the hybrid public warning system 100 to count number of mobile subscribers inside the target area. This can be done on two levels: 1) count per cell (gives number of people on a cell level) and 2) count per country (gives number of people from each country).

In some embodiments, the hybrid public warning system 100 may be configured to suspend (pause) an alert, resume a suspended alert and/or cancel it, until the alert is in completed state.

Follow-Up Alert:

"Follow-up" in the present context refers to sending messages to target subscribers who have already received an alert. A follow-up will typically include all of the target subscribers from the original alert, also including those that did not receive the original message. In an example, the hybrid public warning system 100 changes how the target subscribers are identified by switching from a geofencing polygon to the relevant previously assigned alert ID used. The target subscriber list will then be a static list, no longer based on where they are but rather based on the fact that they have received an alert before. As a nonlimiting example, the target subscribers in a follow-up situation could evacuate people who are now spread around outside the original alert area. The process may be the same with a follow-up alert as it is with a normal polygon-based alert. In some embodiments, the hybrid public warning system 100 can even combine the use of a geofencing polygon with a follow-up to define the target subscribers.

Keep Alive:

In some embodiments, the hybrid public warning system 100 may utilize a "keep alive" flag to define that a particular alert has a duration. If the keep alive flag is set, the hybrid public warning system 100 may send multiple alerts within the duration period, but only one message per recipient. When keep alive is active, a new subscriber entering the alert area will get a message. But none of the subscribers will get the message multiple times. The LB P2P messaging engine 112 will make sure that this will be taken care of.

Include and Exclude Lists:

In some embodiments, the API 164 may be configured to support include (or "white") and/or exclude (or "black") lists. Due to privacy concerns, this filtering may need to be done on an MTSP's side since no privacy sensitive data, like location information, is allowed to be shared outside MTSP's system.

Example: If a user wants to send messages only to a pre-defined group of people (but still based on where they are), for example, first responders, this list needs first to be uploaded into the API 164 (and stored in the hybrid LB alert system 108(1) to 108(3)). This list will include first responders' mobile numbers (MSISDNs) and name. If the user of the hybrid public warning system 100 wants to send to first responders inside a geofencing polygon, they can use this include list as a filter in combination with the polygon when sending messages.

In some embodiments, the API 164 may come with a set of admin methods for creating and deleting such subscriber lists (include and exclude lists) and it also includes methods for adding and deleting mobile numbers to these lists. Only subscribers who are both in the area and on the include list are alerted, and/or subscribers who are in the area but not on the exclude list. It is also possible to combine include and exclude lists as a filter in the same alert. For example, one can picture a Venn diagram having two overlapping circles, one representing the total number of subscribers in the target region and the other representing all of the subscribers on an include list. The region where these two circles overlap represents the subscribers that are both in the target region and on the include list. In this example, it is these subscribers that are the target subscribers to whom the hybrid public warning system 100 will send the alert message text. That is, the hybrid public warning system 100 will not send the alerts to either the subscribers in the target region not on the include list or the subscribers on the include list and not in the target region. In another example, the two circles represent, respectively, the subscribers in the target region and the subscribers on an exclude list. In this example, the hybrid public warning system 100 will send the alerts to all of the subscribers in the target region that are not on the exclude list. In the corresponding Venn diagram, these target subscribers are the subscribers in the target-region circle and outside of the overlapping region where the exclude-list circle overlaps with the target-region circle. As a further example, both include and exclude lists can be used together with a target-region list. In Venn diagram form, this is represented by three overlapping circles, with the only subscribers receiving the alert being the target subscribers that are in both of the target-region and include-list circles and not in the exclude-list circle.

B—Use Case (Smart Sending):

An alert message must be sent out to everyone within a certain timeframe. In some cases 15, 10, or 5 minutes is more than enough time to get out the message. In some other cases, time is extremely important (can be earthquake forecast, missiles coming in over the border and alert must be sent out to millions of people) and the message must be received by everyone within 20-30 seconds.

A hybrid LB alert system of the present disclosure can calculate an estimate of the time it will take to send out all messages via SMS with this input:

Total available throughput towards the SMS-C (can be, for example, 3000 SMS/Sec; can be less or more).

How many alerts are sent out in parallel in the platform at the moment (concurring alerts).

How congested the network is at the moment (by technology, e.g., 2G, 3G, 4G, 5G) by instant monitoring the delivery reports coming in.

How many subscribers there are on each of the cell sites at the moment. The throughput on 2G versus 3G versus 4G versus 5G cell is determinable.

How many radio cell sites are in the alert area (by technology).

And with all these inputs, the hybrid LB alert system can calculate how much time it will take for all target subscribers in the area to receive the SMS message for a given alert before sending it. Based on this and the time requirement (e.g., the available message-dissemination time $T_{Avail}$ or another value) for that specific use case—the hybrid LB alert system can automatically decide if it is going to send SMS, CB, or both. The user does not need to decide, because that will take time. In some embodiments, the hybrid LB alert system can even automatically monitor the progress during sending and switch on CB if necessary (if the hybrid LB alert system detects congestion or estimates that the sending takes longer time than the estimate).

Example

A tsunami is on its way towards the coastline. The messages need to go out to 200,000 people within 2 minutes. There are approximately 1000 cell sites in the area. 10% are 2G, 30% are 3G, and the rest, 60%, are 4G. 87% of the subscribers are camping on the 4G cell sites (more high capacity and pico cell sites). No other concurring alert is in progress in the platform. The hybrid LB alert system automatically decides to go for SMS based on this, for example, using a decision algorithm, such as the decision algorithm 236 described above relative to FIG. 2. The hybrid LB alert system calculates the estimated time to send all messages to be, for instance, 1 minute and 23 seconds. Since SMS reaches more people, the hybrid LB alert system makes this the preferred channel. But after 34 seconds, the hybrid LB alert system detects a local congestion in a part of the area. It automatically turns on the cell broadcast messaging in that area (done within seconds, the hybrid LB alert system already knows which cell sites and the message text).

A hybrid LB alert system of the present disclosure can provide an extremely robust and intelligent system. In some embodiments, the hybrid LB alert system can be augmented with machine learning, for example, to understand the network over time and make decisions in the future based on experience from the past.

C—Use Case (History Module):

A user wants to send out a message to people who used to be in the area many hours ago or have been there just for a period of time).

A hybrid LB alert system of the present disclosure may include history capabilities so that it can "remember" prior locations for subscribers. Depending on how much storage the hybrid LB alert system can access, it can store data from a long time back in time (e.g., 24 hours, with snapshots every 15 minutes for the whole subscriber base).

Example

A bacteriological leak in an area 5 hours ago, or someone is missing and was last seen in that area 16 hours ago, the user of the hybrid LB alert system wants to communicate with those people and only them (not necessarily to the subscribers who are in the target region right now). If the use case is related to an incident back in time, the hybrid LB alert system may decide to go for SMS rather than CB.

Another example where a hybrid LB alert system of the present disclosure can automatically decide to use both channels is one in which a user wants to communicate with target subscribers who have been in the area in the last 11 hours. The area is still polluted, and it is urgent that people must leave as soon as possible. The hybrid LB alert system can send out SMS messages to subscribers who have been in the area but have left. These subscribers can get an SMS with a separated message (like "go see a doctor"). Subscribers who are still there will see a CB evacuation message that the hybrid LB alert system sends out.

D—Use Case (Opt-in, Subscriber List):

A user wants to send out a message to only a sub-set of the population of the target subscribers. This can be a certain group of pre-defined subscribers, e.g., disabled, first responders, etc. A hybrid LB alert system of the present disclosure may include opt-in functionality. SMS can be used when only certain groups of subscribers should be alerted in an area.

E—Other Example Uses Cases

Other use cases/examples in addition to the examples above:

If a carrier is only implementing CB-C with their 4G network, they can use SMS-C to send out messages to subscribers who are camping on 2G, 3G and maybe 5G.

When the LB alert system builds a capability database with information about which handsets support CB and which do not, the hybrid LB alert system can send SMS to non-supported CB devices. It should also be possible for subscribers to opt-in to SMS if they want to have a SMS or they claim that they do not see the CB messages in planned national exercises.

One separate SMS message may be sent to first responders or disabled persons (opted in) in the area. CB can be used for the rest of the population.

In cases when both reach and time are important, the hybrid LB alert system can send out both SMS and CB. These two technologies are not using the same network bandwidth, so a duplicated message will not affect the throughput in either of the channels. If subscribers feel that it is annoying to get two messages, they can turn off the SMS for the future (here, opt-out filters could be used for those subscribers and subscribers can easily opt out by replying to the message with a certain command word, like "STOP" or something similar. The response can be explained in the messages going out). If subscribers do this, they will only see CB messages in the future. The opt-in flag for this mobile number must be removed again automatically when user gets a new mobile device (in some embodiments, the LB alert system can see that in IMEI change from location source).

Many use cases related to follow up and tourists/in-bound roamers can be important in some embodiments.

SMS can also be used to communicate with out-bound roamers, since CB is not supporting that (travelling to other countries).

Example Architecture Considerations:

A few considerations for some embodiments of a hybrid LB alert system of the present disclosure:

The CB-C can be deployed together with location-based P2P Messaging as one hybrid package.

The decisions on the choice with SMS versus CB in the different cases can be aligned across all carriers in a particular country. In one example, the location-based P2P messaging gateway example (FIG. 1) can handle and manage that. In some embodiments, all the platforms may synch some inputs to the gateway and the gateway will orchestrate what to do in the different cases (for the whole population).

In some embodiments, some customers might even not need to have SMS-C connection. Still they can have access to situational awareness functionality to see how many people are affected, where they are, and who they are (nationality or other profile data that might be added. Can even be how many first responders, how many disabled, etc. in the area). It is noted the "who they are" data may only display cell numbers and not personal information to avoid privacy violations. For example, the system can tell how many people from Germany are in a target area or a number of disabled people or similar information, but there is no direct knowledge of who the individuals actually are.

Some embodiments use a snapshot method whereby the system takes a snapshot of the last location of all mobile subscribers in the network/country every X minutes over the last Y hours (configurable and depending on the storage scaling of the installation). An example is every 15 minutes over the last past 24 hours. This can be a gliding window and new snapshots will overwrite the oldest ones.

Data can be stored in unique data structures customized to the functionality(ies) provided. If a message is sent earlier, the information about who receives this message is stored (like a snapshot, but only for the target region). The hybrid LB alert system can then use this as a kind of location store instead of the others. Each given message sent will have a unique alert ID, and the hybrid LB alert system can send a message again and again to previous alert IDs.

In some embodiments, a "footprint" is a variant of history, but more complex. A footprint is a list of the most visited cell sites in the network by subscriber in the last X days. Example: It can have information about the most visited places a subscriber has been in the last 7 days. Also this can be a gliding window. This can also be used as a location source. A person might be at work, but if something is happening around his home, it will be possible to send an alert to him, also when not present in the area (since he probably has an interest in that area since he is often visiting it). To be able to do this, all activity during that period needs to be stored, so that the system can make a top list of most visited cell sites.

Some embodiments have an ability to send different alert messages based on differing locations for a single event. For example, a hurricane is approaching and people currently located in city A are told to evacuate, while people in nearby areas are warned but not told to evacuate. This can be done in two steps. First a message will be sent out in the evacuation zone. The hybrid LB alert system may include the support of a unique token. This token can be reused for the next alert. The new alert can be a larger area totally overlapping the first one. If the token is used on the second alert, the subscribers receiving the first message will not get the second one. These two messages can be different, and thereby support the example.

SMS and CB can be supported in 2G, 3G, 4G and near future 5G. SMS will always work for all generations. In some installations, the CB-C (cell broadcast center, responsible for broadcasting CB messages) might be integrated only to a few of these technologies. A hybrid LB alert system of the present disclosure can know exactly which cell sites and generations the different subscribers are connected to currently. So there is also a use case where the system can send SMS messages to subscribers connected to cell sites (of a certain generation) with no support for cell broadcast. Some operators might decide to reduce the connectivity of their CB-C to only some generations just to reduce the cost (more expensive to integrate to all generations than only some).

The system can know a typical throughput of SMS with the different generations of cell sites. It might take minutes to get out messages to all subscribers within a 2G cell. But it can take less than 30 seconds to do the same in 4G. A hybrid LB alert system of the present disclosure can estimate how long of time it will take to send SMS messages (based on cell generations and number of people inside each and every one of these, and if it will take a longer time than the user requires, the system will automatically turn on CB on those cell sites instead (or maybe even the whole alert areas).

Based on the TAC code in IMEI (comes from the location source) a messaging system of the present disclosure can decide the make and model of the handset (example: iPhone X). The system can be designed and configures to build up a capability database with the information about which models support CB and which do not. The system can then send SMS messages to a handset not supporting CB. This database can be built up based on experience or/and information.

Example Computing System

Any one or more of the aspects and embodiments described herein may be conveniently implemented using one or more machines (e.g., one or more computing devices that are utilized as a user computing device for accessing GUIs of the present disclosure, such as GUI 700 of FIGS. 7-10 or any other UIs and/or individual UI features described herein and/or one or more server devices, such as servers for implementing any of the functionalities of a hybrid LB alert system of the present disclosure, such as the hybrid public warning system 100 of FIG. 1 or any other hybrid LB alert system and/or individual feature or combination of features described herein, among others) programmed according to the teachings of the present specification, as will be apparent to those of ordinary skill in the computer arts. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments, and/or portion(s) thereof, described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof.

Figure 11:
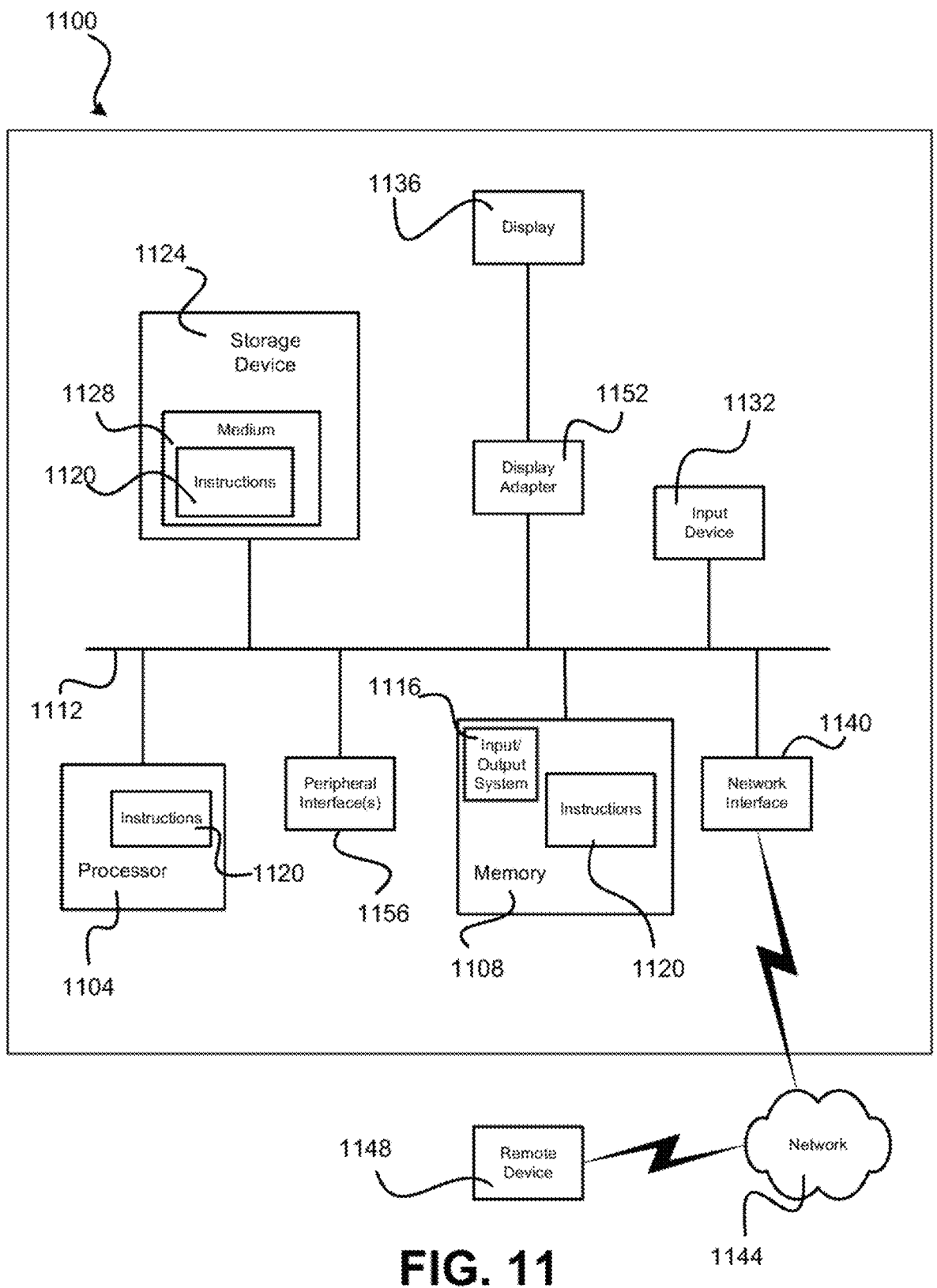
FIG. 11 is a high-level diagram illustrating an example computing system that can be used to execute machine-executable instructions for performing any one or more of functionalities described herein or portion(s) thereof.

FIG. 11 shows a diagrammatic representation of one example of a computing device in the exemplary form of a computer system 1100 within which a set of instructions for performing any one or more of the aspects and/or methodologies of the present disclosure, or any portion(s) thereof, may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Memory 1108 may include various components (e.g., machine-readable media) including, but not limited to, a random access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A method, performed automatically by an alert system on a wireless communications network, of alerting a set of target subscribers via mobile devices carried by the target subscribers, the method comprising:
   identifying the mobile devices of the set of target subscribers as targets for receiving an alert within a message-dissemination time;
   estimating a message-sending time to send an alert to the mobile devices via at least one point-to-point messaging channel;
   comparing the message-sending time to the message-dissemination time;
   based on the comparing, determining whether or not to broadcast the alert on a broadcast messaging channel; and
   based on determining whether or not to broadcast the alert on a broadcast messaging channel, either:
      begin broadcasting the alert on the broadcasting messaging channel; or
      begin or continue sending the alert on the at least one point-to-point messaging channel.

2. The method of claim 1, wherein identifying the mobile devices includes receiving an identification of a target region via an interactive map and using the target region to identify the mobile devices.

3. The method of claim 1, further comprising:
   initially using only the one or more point-to-point messaging channels to send the alert;
   while sending the alert using only the one or more point-to-point messaging channels, continually: re-estimating the message-sending time and comparing the re-estimated sending time to time remaining of the message-dissemination time; and
   upon determining the re-estimated message-sending time exceeds the time remaining of the message-dissemination time, broadcasting the alert on the broadcast messaging channel.

4. The method of claim 1, further comprising presenting to a user a graphical user interface that includes:
   an interactive map configured that allows the user to define a target region for the alert; and
   an alert-timeframe control configured to allow the user to set an alert timeframe for determining possible target subscribers that should receive the alert.

5. The method of claim 4, wherein the alert-timeframe control allows the user to set each of a future component of the alert timeframe and a past component of the alert timeframe.

6. The method of claim 5, wherein the alert-timeframe control includes a pair of graphical sliders on a timeline, with one of the graphical sliders allowing the user to set the future component and the other of the graphical sliders allowing the user to set the past component.

7. The method of claim 1, wherein estimating a message-sending time includes monitoring congestion on the wireless communications network.

8. The method of claim 7, wherein the alert is disseminated via a plurality of cell sites, and monitoring congestion is performed on a cell-site-by-cell-site basis.

9. The method of claim 8, wherein comparing the message-sending time to the message-dissemination time and determining whether or not to broadcast the alert on a broadcast messaging channel are performed on a cell-site-by-cell-site basis.

10. The method of claim 1, further comprising presenting to a user a graphical user interface that includes an alert-delivery region that displays a set of differing alert-delivery options.

11. The method of claim 10, wherein the alert-delivery region displays a message-dissemination-time estimate for each of the differing alert-delivery options.

12. The method of claim 10, wherein the alert-delivery region displays a reach value for each of the differing alert-delivery options, wherein each reach value is an estimate of a number of the mobile devices actually reachable within the message-dissemination time by the corresponding delivery option.

13. The method of claim 12, wherein each reach value is expressed as a percentage of a total number of potentially reachable ones of the mobile devices.

14. The method of claim 10, wherein the alert-delivery region includes a graphical control that allows the user to change which one of the alert-delivery options the alert system is currently implementing.

15. The method of claim 10, wherein one of the alert-delivery options is a hybrid alert option that uses a combination of point-to-point messaging and broadcast messaging.

16. The method of claim 1, wherein the alert is disseminated relative to a target region and an alert timeframe, and identifying the mobile devices as targets includes reviewing a footprint datastore containing historical location data to determine ones of the target subscribers anticipated to be in the target region in a future component of the alert timeframe.

17. The method of claim 16, wherein the alert timeframe includes a past component, and identifying the mobile devices as targets is based at least in part on identifying presence within the target region during a past component of the alert timeframe.

18. The method of claim 17, wherein identifying presence within the target region includes accessing at least one subscriber-wide locations snapshot taken during the past component of the timeframe.

19. The method of claim 1, wherein the alert is disseminated relative to a target region and an alert timeframe, and identifying the mobile devices as targets includes identifying the mobile devices based at least in part on predicting presence within the target region during a future component of the alert timeframe.

20. The method of claim 19, wherein predicting presence within the target region includes accessing a top locations datastore that contains location histories for mobile devices connected to the wireless network.

21. The method of claim 1, further comprising:
receiving an identification of a target region corresponding to the alert;
receiving an alert timeframe for issuing the alert for the target region;
reviewing a footprint to predict whether a subscriber and corresponding first mobile device that are located outside of the target region will be in the target region within the alert timeframe; and
upon determining the subscriber is predicted to be in the target region within the alert timeframe, identifying the first mobile device of the subscriber as one of the targets for receiving the alert.

22. The method of claim 21, further comprising, upon determining the subscriber is predicted to be in the target region within the alert timeframe, sending a point-to-point alert message to the first mobile device while the first mobile device is outside of the target region and before the subscriber is predicted to be within the target region.

23. The method of claim 21, wherein the target region includes at least one cell site, and the footprint is determined using a history datastore that contains locational data based on a series of snapshots of subscribers connected to the at least one cell site taken at differing times.

24. The method of claim 21, wherein the target region includes at least one cell site, and the footprint includes a list of top cell sites for the subscriber that includes the at least one cell site.

25. The method of claim 21, wherein receiving an alert timeframe includes receiving an alert timeframe having a future portion, and the method further includes predicting whether or not the subscriber will be in the target region within the future portion of the alert timeframe.

26. A non-transitory machine-readable storage medium containing machine-executable instructions that, upon being executed by at least one processor, perform the method of any one of claims 1-25.

* * * * *